US005714062A

United States Patent [19]
Winkler et al.

[11] Patent Number: 5,714,062
[45] Date of Patent: Feb. 3, 1998

[54] DIFFUSER CONDUIT JOINT

[75] Inventors: William W. Winkler, Delafield; William H. Roche, Mequon, both of Wis.

[73] Assignee: Water Pollution Control Corporation, Brown Deer, Wis.

[21] Appl. No.: 482,392

[22] Filed: Jun. 7, 1995

Related U.S. Application Data

[63] Continuation of PCT/US94/11107, Sep. 30, 1994, which is a continuation-in-part of Ser. No. 130,515, Oct. 1, 1993, abandoned.

[51] Int. Cl.$^6$ .......................... F16L 47/00; F16L 19/00; B01F 3/04; C02F 3/20
[52] U.S. Cl. .................. 210/220; 210/238; 261/122.1; 261/124
[58] Field of Search .............................. 210/220, 238; 261/122.1, 124; 285/330, 913

[56] References Cited

U.S. PATENT DOCUMENTS

| 1,057,928 | 4/1913 | Briggs . |
| 1,263,252 | 4/1918 | Jencick . |
| 1,278,869 | 9/1918 | Daviess . |
| 1,307,160 | 6/1919 | Stokes . |
| 1,514,052 | 11/1924 | Kaiser . |
| 1,704,939 | 3/1929 | Grauel . |
| 1,781,091 | 11/1930 | Wilson . |
| 2,176,504 | 10/1939 | McLaughlin . |
| 2,195,492 | 4/1940 | McDonald . |
| 2,305,668 | 12/1942 | Bruno . |
| 2,423,069 | 6/1947 | McElhose et al. . |
| 2,464,744 | 3/1949 | Fennema . |
| 3,064,998 | 11/1962 | Syverson . |
| 3,104,896 | 9/1963 | Kennedy, Jr. . |
| 3,198,555 | 8/1965 | Johnson et al. . |
| 3,532,272 | 10/1970 | Branton . |

(List continued on next page.)

FOREIGN PATENT DOCUMENTS

| 134927 | 4/1947 | Australia . |
| 134927 | 4/1987 | Australia . |
| 930398 | 7/1973 | Canada . |

(List continued on next page.)

OTHER PUBLICATIONS

Colaflex Diffusers, Bulletin 6530–B.
"Chicago"—Stationary Diffuser Tube, Aeration Systems, Chicago Pump Company copywrite 1938.
"Pipe Economy" Published by Clow Corporation, Copyright 1975.
English Translation attached to German Patent No. 38 09 016.
English Abstract attached to German Patent No. 38 09 016 as published by Derwent Publications Ltd., 1989.
English Abstract attached to Japanese Patent No. 1–303395.

*Primary Examiner*—Thomas M. Lithgow
*Attorney, Agent, or Firm*—Pollock, Vande Sande & Priddy R.L.L.P.

[57] ABSTRACT

In grid-type aeration systems with diffusers mounted and spaced longitudinally along air distribution conduits that are submerged in wastewater and secured to and above the floors of aeration tanks, such conduits are provided with couplings having first and second matingly compatible coupling sections of synthetic polymeric material adapted for relative rotation with respect to each other, at least one locking projection having a fixed position with respect to one of the coupling sections, and a locking receptacle array including locking receptacles having a fixed position with respect to the other coupling section. The projection and receptacles are relatively moveable in the coupling for motion from a non-engaged condition to an engaged condition during make up of the coupling. During make up of the couplings an installer may cause relative rotation of the conduits to align the diffuser gas discharge surfaces substantially horizontally and, with the couplings in made up condition, positively lock the conduits against relative rotation to maintain the gas discharge surfaces in alignment.

65 Claims, 12 Drawing Sheets

5,714,062
Page 2

U.S. PATENT DOCUMENTS

| | | |
|---|---|---|
| 3,726,546 | 4/1973 | Brown . |
| 3,726,745 | 4/1973 | Gidge et al. . |
| 3,802,676 | 4/1974 | Thayer . |
| 3,863,959 | 2/1975 | Blaschke . |
| 3,953,553 | 4/1976 | Thayer . |
| 4,012,470 | 3/1977 | Thayer . |
| 4,076,285 | 2/1978 | Martinez . |
| 4,077,657 | 3/1978 | Trzeciak . |
| 4,185,856 | 1/1980 | McCaskill . |
| 4,215,082 | 7/1980 | Danel . |
| 4,288,394 | 9/1981 | Ewing et al. . |
| 4,341,481 | 7/1982 | Wollensak . |
| 4,341,482 | 7/1982 | Wollensak . |
| 4,348,956 | 9/1982 | Schmidlin . |
| 4,382,867 | 5/1983 | Schmit et al. . |
| 4,427,222 | 1/1984 | Abbes et al. . |
| 4,428,893 | 1/1984 | Cummings . |
| 4,429,902 | 2/1984 | Cowan . |
| 4,468,055 | 8/1984 | Reimert . |
| 4,512,596 | 4/1985 | Obrecht . |
| 4,519,633 | 5/1985 | Nichols . |
| 4,563,277 | 1/1986 | Tharp . |
| 4,578,608 | 3/1986 | Mech et al. . |
| 4,607,865 | 8/1986 | Hughes . |
| 4,674,774 | 6/1987 | Williams . |
| 4,674,775 | 6/1987 | Tajima et al. . |
| 4,735,439 | 4/1988 | Sande . |
| 4,821,818 | 4/1989 | Mefferd . |
| 4,877,270 | 10/1989 | Phillips . |
| 4,887,849 | 12/1989 | Briet . |
| 4,960,546 | 10/1990 | Tharp . |
| 5,026,024 | 6/1991 | Ito . |
| 5,051,193 | 9/1991 | Cummings . |
| 5,054,822 | 10/1991 | McGushion . |
| 5,058,935 | 10/1991 | Eidsmore . |
| 5,066,051 | 11/1991 | Weigl et al. . |
| 5,176,406 | 1/1993 | Straghan . |
| 5,188,398 | 2/1993 | Parimore . |
| 5,188,399 | 2/1993 | Durina . |
| 5,257,835 | 11/1993 | Baumbach . |
| 5,266,239 | 11/1993 | Drewery . |
| 5,269,572 | 12/1993 | Mefferd . |
| 5,290,487 | 3/1994 | Ludwig . |
| 5,299,843 | 4/1994 | Weigl . |
| 5,340,508 | 8/1994 | Thompson . |
| 5,350,200 | 9/1994 | Peterson . |

FOREIGN PATENT DOCUMENTS

| | | |
|---|---|---|
| 949229 | 6/1974 | Canada . |
| 0 045 724 | 2/1982 | European Pat. Off. . |
| 1 426 326 | 4/1966 | France . |
| 2 319 834 | 2/1977 | France . |
| 2361208 | 12/1972 | Germany . |
| 26 34 367 | 2/1977 | Germany . |
| 26 13 162 | 9/1977 | Germany . |
| 2610387 | 9/1977 | Germany . |
| 2817060 | 10/1979 | Germany . |
| 3605398 | 8/1987 | Germany . |
| 3716806 | 12/1988 | Germany . |
| 3744608 | 7/1989 | Germany . |
| 3809016 | 9/1989 | Germany . |
| 3812211 | 11/1989 | Germany . |
| 4033167 | 4/1992 | Germany . |
| 1-303395 | 12/1989 | Japan . |
| 4-197490 | 7/1992 | Japan . |
| 67 09 487 | 1/1968 | Netherlands . |
| 6709487 | 1/1968 | Netherlands . |
| 152860 | 10/1963 | U.S.S.R. . |
| 924342 | 4/1982 | U.S.S.R. . |
| 979612 | 12/1982 | U.S.S.R. . |
| 412842 | 7/1934 | United Kingdom . |
| 824376 | 11/1959 | United Kingdom . |
| 1 163 184 | 4/1969 | United Kingdom . |
| 1 213 294 | 11/1970 | United Kingdom . |
| 1459418 | 12/1976 | United Kingdom . |
| 1511656 | 5/1978 | United Kingdom . |
| 2 084 277 | 4/1982 | United Kingdom . |
| 2 223 814 | 4/1990 | United Kingdom . |

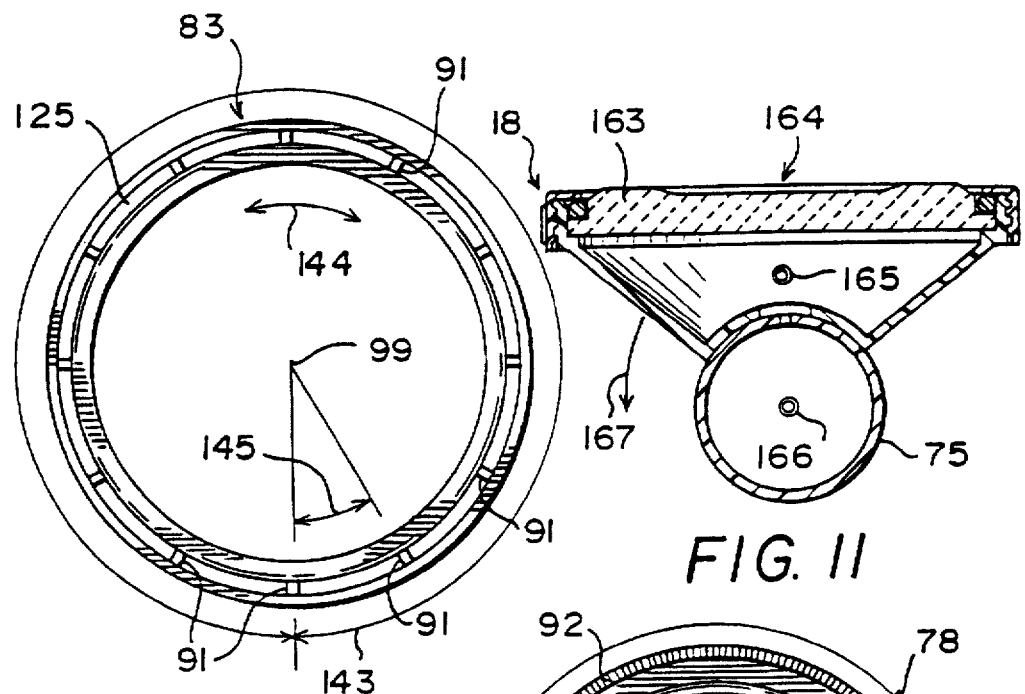
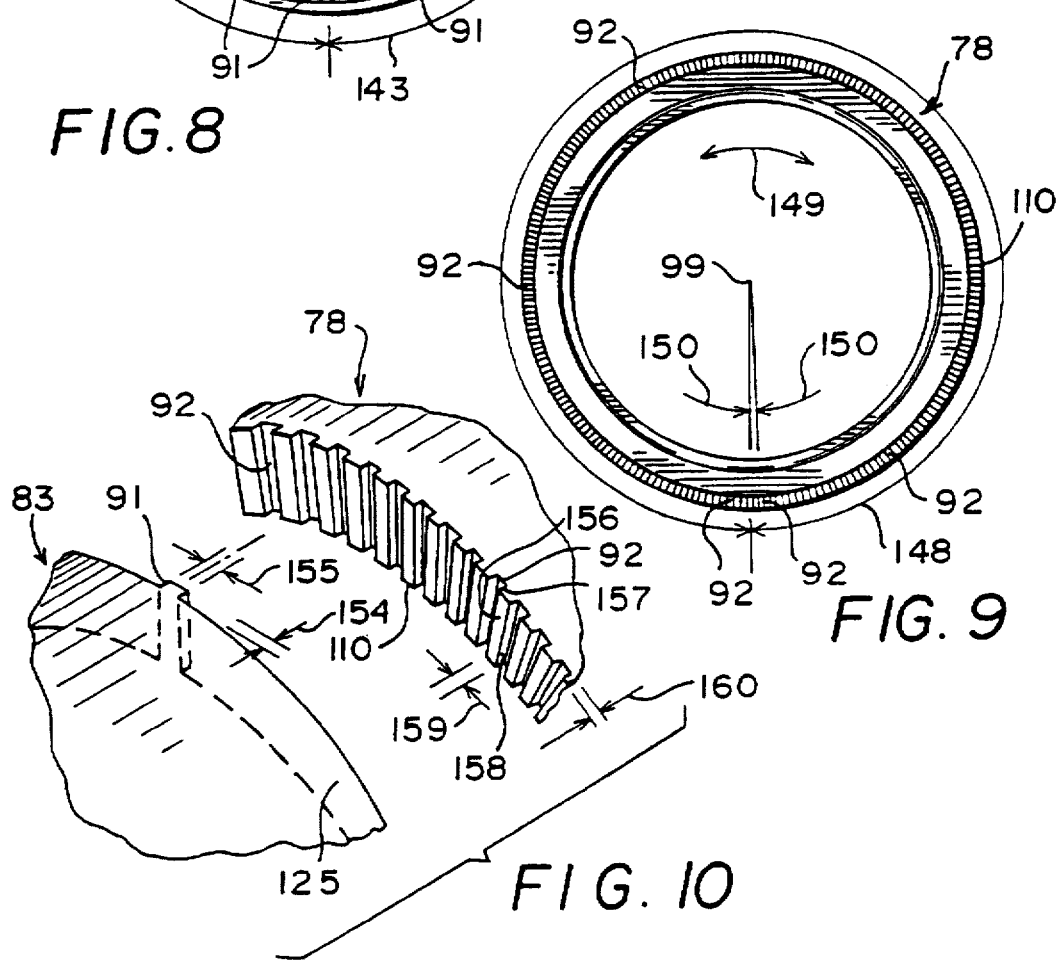

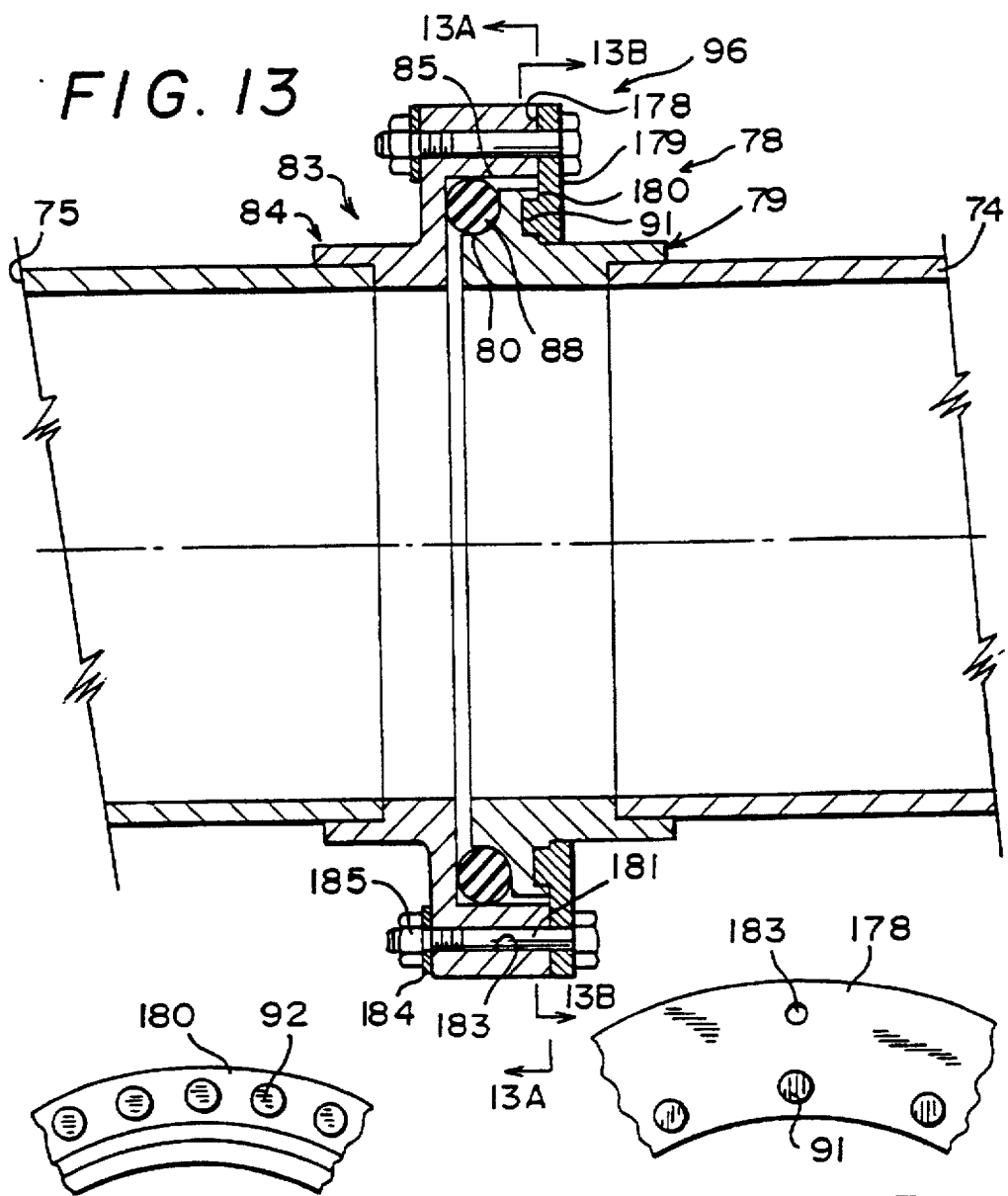
FIG. 13
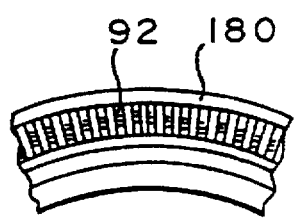
FIG. 13A
FIG. 13A'
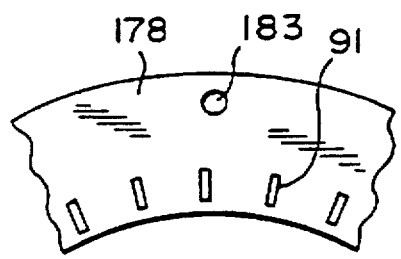
FIG. 13B
FIG. 13B'

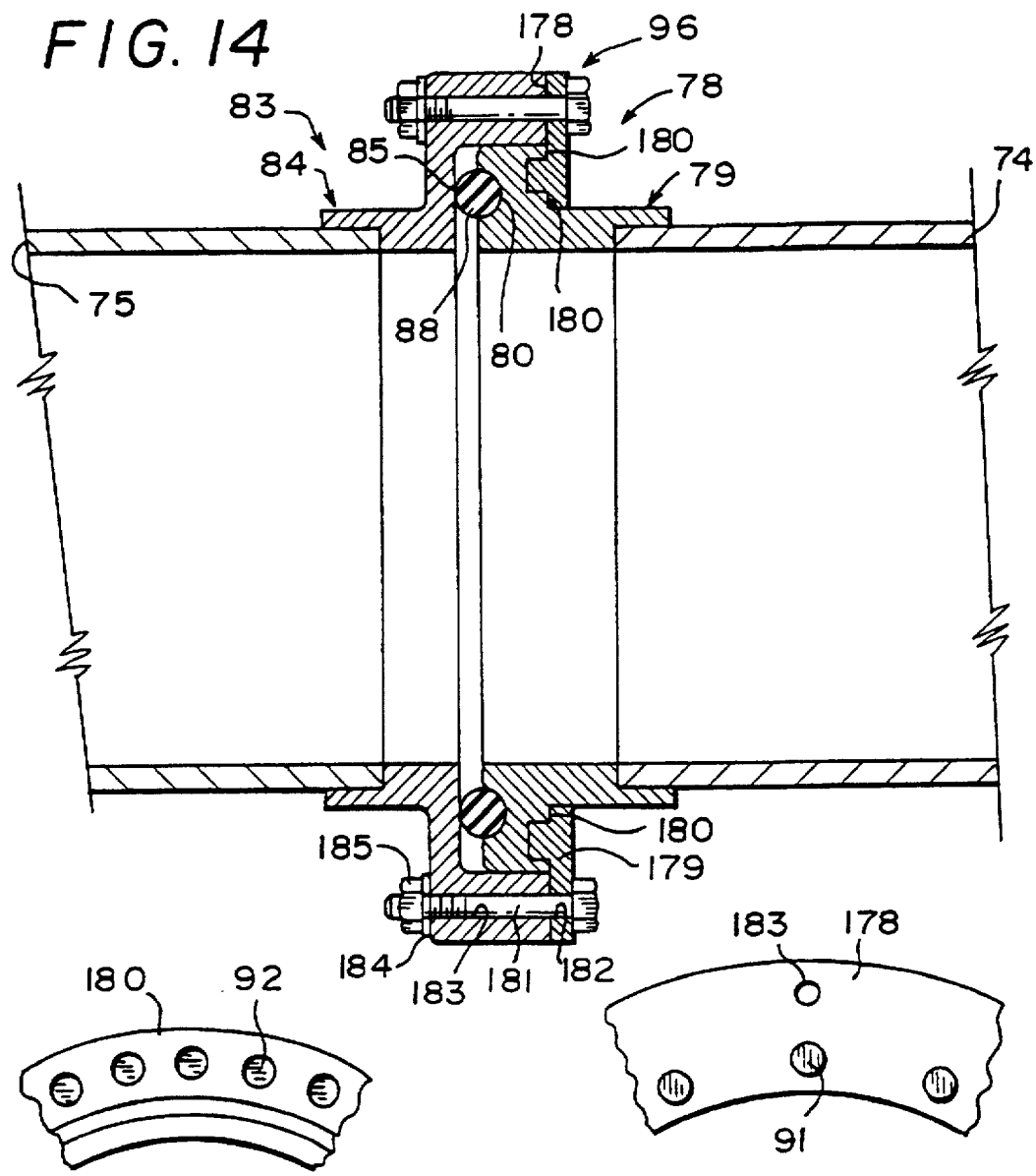
FIG. 14
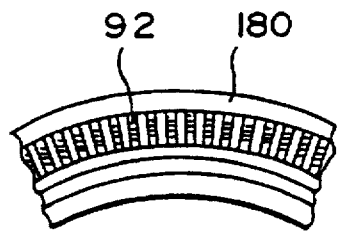
FIG.14A
FIG.14A'
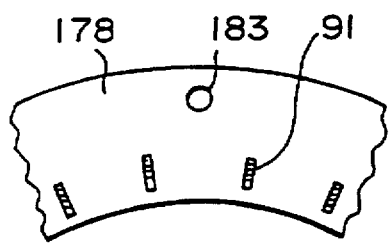
FIG.14B
FIG.14B'

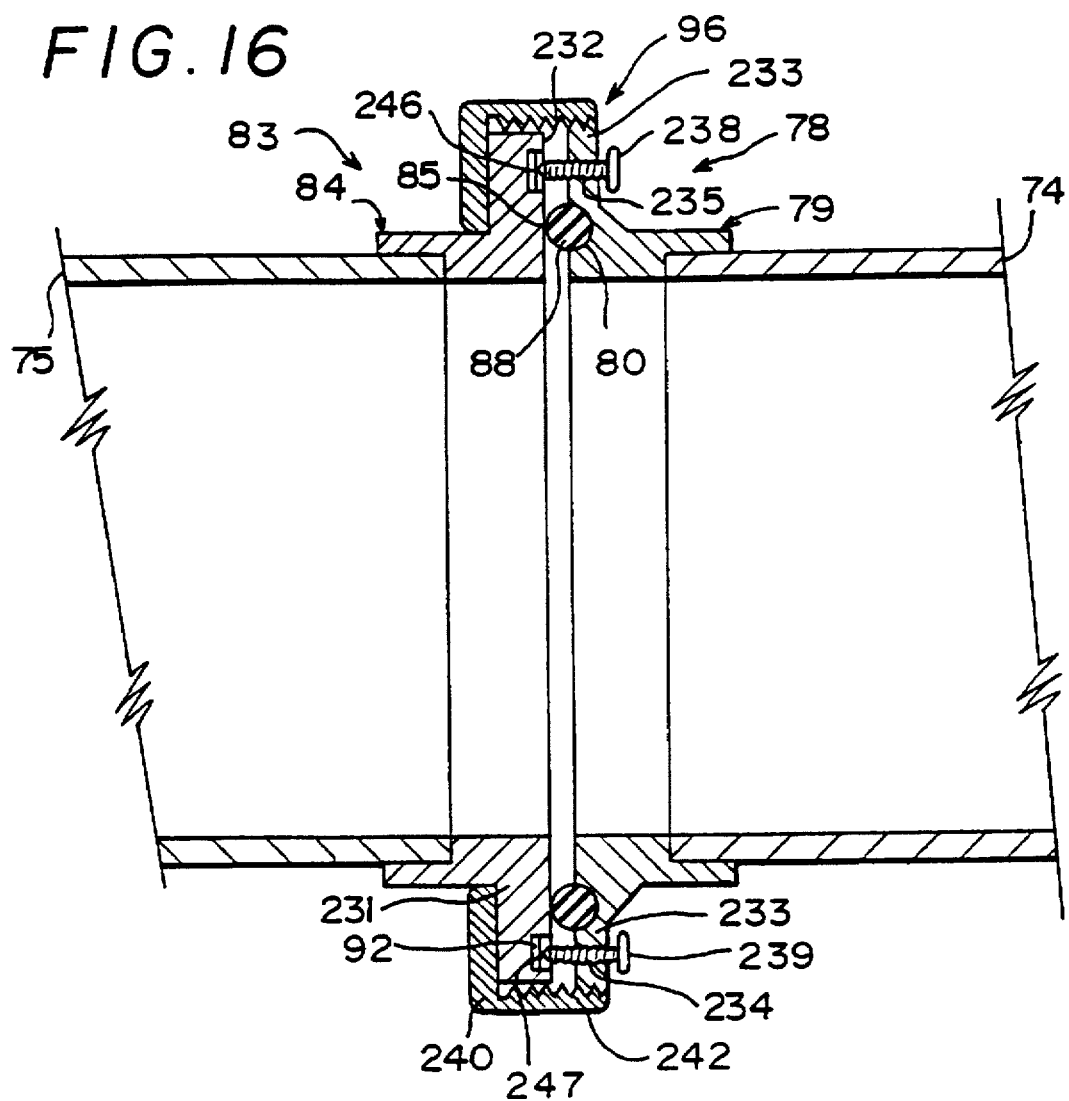
FIG. 16
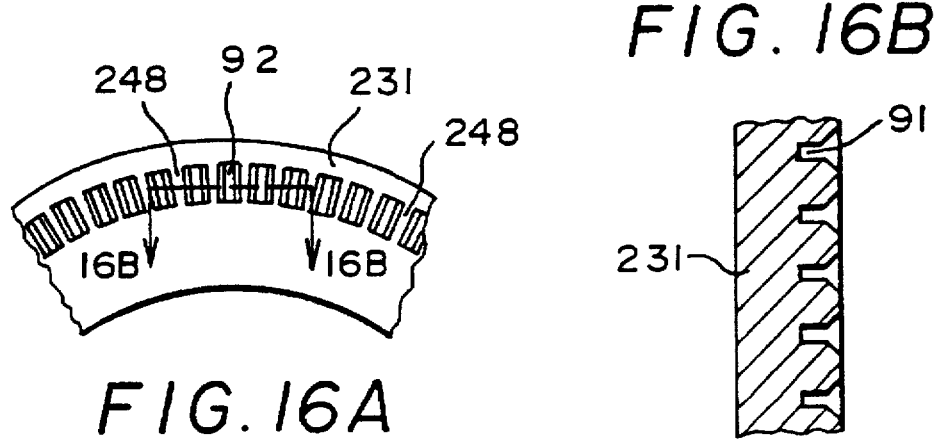
FIG. 16A
FIG. 16B

DIFFUSER CONDUIT JOINT

RELATED APPLICATIONS

This is a Continuation of PCT International Application No. PCT/US94/11107 designating the United States and filed Sep. 30, 1994, which is a Continuation-In-Part of U.S. Application Ser. No. 08/130,515 filed Oct. 1, 1993, (now abandoned) the entire contents of said prior applications being expressly incorporated herein by reference.

TECHNICAL FIELD

This invention relates to waste water treatment, particularly wastewater aeration. A preferred embodiment relates to grid-type aeration systems with diffusers mounted and spaced longitudinally along air distribution pipes that are submerged in wastewater and secured to and above the floors of aeration tanks.

BACKGROUND OF THE INVENTION

One example of the wide variety of aeration processes to which the invention is applicable is activated sludge processing, in all of its many alternative forms. This process, through a sub-process called aeration, furnishes oxygen to support the metabolism of microorganisms in the wastewater. These consume waste products in the water. Over the years, the devices used to conduct aeration, including the air discharge devices known as diffusers and their associated air supply conduits, have evolved considerably.

One fairly early form of diffuser employed porous rectangular diffusion elements, typically square or rectangular ceramic plates about one inch thick, through which to bubble air into a tank containing the wastewater. These diffusion elements were often mounted in series, bridging across and extending along the top edges of channels in the floors of the tanks. Sometimes the elements were mounted instead in the tops of boxes suspended above or resting upon the bottoms of the tanks.

Air under pressure from an air source, for example a blower or compressor, was supplied through conduits to the channels or boxes and was discharged through the porous elements. Conduit systems for feeding the channels were often installed in or below the tank floor. Boxes, when used, were often fed by vertical "down-comer" pipes from supply conduits above the surface of the wastewater.

By the 1950's, a number of "grid" type systems were evident in Europe. These fundamentally different systems departed from prior practice as to the design and mounting of the diffusers and the layout of the pipes that supplied air to them. In a grid system, there is a network which includes horizontal gas distribution conduits, submerged in the wastewater and secured to and above the floor of the aeration tank, preferably a short distance above such floor, that support the diffusers in the wastewater and supply air to them.

FIGS. 1–3 show an illustrative grid type aeration system commonly used for conducting the aeration phase of activated sludge processing. FIG. 1 schematically illustrates an aeration tank 1 having a floor 2, sidewalls 3 (only one of which is shown) and end walls 4 (only one of which is shown). Suitable inlets (not shown) and outlets (not shown), all of which are familiar to those skilled in the art, are provided for introduction and discharge of wastewater and treated water.

Such tanks are provided with air or other oxygen containing gas (including substantially pure oxygen, ozone or mixtures of one or both of these gases with others) from a gas source 6. Air is preferred. Normally, it is withdrawn from the atmosphere in large volumes through filters into compressors or blowers, conveyed from their outlets to the vicinity of one or more air tanks and introduced into air mains there.

There may be one or more air mains for each tank. An example of an air main 7 appears in FIG. 1. It extends along the length of tank 1 above the surface of wastewater (not shown) that is under treatment in the tank. By means of upper elbow 8, air from air main 7 is directed into downcomer 9 and lower elbow 10, both shown in FIG. 2.

Lower elbow 10 delivers air from downcomer 9 into manifold 14. A plurality of saddle-base nipples 15 emanate from the manifold at spaced longitudinal intervals along its sides, to deliver air through plain couplings 16 into gas distribution conduits 17. Thus, air is conveyed from a given manifold through nipples and gas tight couplings into a number of parallel gas distribution conduits. Each of these conduits supports a plurality of diffusers 18 of which a wide variety of types and designs are known. Air delivered under pressure from the source enters the manifold, passes into the gas distribution conduits, enters the diffusers through openings in the conduit walls and is forced through the diffusers into the wastewater.

Grid type aeration systems usually include hundreds, thousands or tens of thousands of individual diffusers supported upon gas distribution conduits at longitudinally spaced intervals. In their most common applications, grid systems have been employed in plants including multiple aeration tanks each having an air main, one or more and often many manifolds with their own respective downcomers and elbows, many long gas distribution conduits carrying the diffusers and many couplings.

As early as the 1950's, gas distribution conduits composed of synthetic polymer material ("plastic") began to replace metal pipes in aeration systems. Grid type systems with essentially all-plastic air distribution conduits and diffusion element holders were suggested during the 1960's, as shown by Branton's U.K. Patent 1,213,294, and were on the market by 1967. A grid type conduit and diffuser system made by the assignee of the present application and composed mainly of synthetic polymer material, is described in Ewing et al U.S. Pat. No. 4,288,394 and has been in commercial use since the 1970's. This system, sold under the registered trademark SANITAIRE, has proven quite popular.

It has been found, especially in larger installations, that grid type aeration systems can be constructed most economically by minimizing the lengths of the larger diameter pipes that are used. Consequently, in order to provide the density of diffusers desired (number of diffusers per unit of floor area), there is a tendency for designers to increase the amount of smaller diameter conduit that is used, that is, the gas distribution conduits. This in turn leads to the use of long gas distributor conduits having a length L (see FIG. 1), which can for example be about 20, 40, 60, 80, 100 feet (6, 12, 18, 24, 30 m) long or longer. The break lines in FIG. 1 call attention to the fact that the figure shows only a portion of the actual number and length of the gas distributor conduits present in a typical grid type aeration system.

A gas distributor conduit can be composed of a single pipe segment. However, as the length of gas distribution conduits increases, considerations of ease in shipment and handing have typically caused these conduits to be formed from plural segments of pipe that can be coupled end-to-end in strings at the time of installation in the wastewater treatment tank.

FIG. 3 contains a schematic illustration of such strings and of how they may be secured to the tank floor and coupled to each other. FIG. 3 discloses elements present in FIGS. 1 and 2, including a cross-section of the manifold 14 and side views of a coupling 16 and gas distribution conduit string 17, the corresponding nipple 15 being omitted to simplify the view. In FIG. 3, the full length of the gas distribution string 17 is shown, but the length of the string has been broken down into four parts to fit within the field of the drawing. Arrows A and B, C and D, and E and F respectively show that in actuality these four parts are not separate, but rather extend in coaxial fashion to form a string that extends along a single straight line from manifold 14 to end cap 22.

However, the string is not one continuous running length of pipe. Rather, to facilitate mass production of gas distribution conduits and associated diffuser parts in factories, the long strings 17 are typically made up of shorter segments, such as first through eighth gas distribution conduit segments 23–30. The lengths of these segments, indicated by dimension arrow 31, are selected for convenience in handling during fabrication, shipping and installation. This length is for example about 20 feet (6 m) in the SANITAIRE product.

A significant portion of the labor involved in installation of grid type aeration systems involves securing gas distribution conduit strings and their manifolds to the tank floor 2. Each manifold 14 may, for example, be supported at spaced positions along its length by plural manifold stands 35 having feet 36 secured to floor 2 by suitable anchors 37 that pass through holes in the feet and penetrate the floor. Legs 38 stiffened by cross braces 39 extend upwardly to any suitable encircling means (not shown) that surround the periphery of the manifold. Manifold stands 35 and their encircling means locally support and maintain the portions of the manifold to which they are attached at a predetermined elevation relative to the floor. The manifold stands also tend to resist axial motion of the ends of the conduit strings that are connected to the manifold.

At longitudinally spaced locations along the strings are fixed line stands having feet 44 and anchors 45, which may be similar to those used in the manifold stands. Stands 43 may for example have first and second legs 46 and 47 and may be equipped with a collar or other gripping means 48 which tightly grips the conduit string outer surface. By virtue of the rigidity of the line stands 43 and the tight grips of their collars 48 upon the exterior surface of the string 17, these stands locally maintain the portions of the string to which they are attached in a substantially fixed position in all vertical and horizontal directions, including lateral and longitudinal, and prevent the particular conduit segments to which they are attached from rotating about their longitudinal axes.

When an aeration tank is in use, the strings of conduits are submerged in the wastewater and the range of seasonal temperature changes in the wastewater seldom exceeds 15° F. (8° C.). However, these strings can be subjected to significant temperature changes, causing substantial thermally induced changes in string length. For example, such strings may be installed in a tank at an ambient temperature of 10° F. (−12° C.). Subsequent to filling and a period of use, the aeration tank may be drained for inspection, repair or maintenance when, due to ambient temperature and radiant heating by the sun, string temperatures may reach 110° F. (43° C.). From installation to draining the strings have been subjected to a temperature change of 100° F. (56° C.), resulting in expansion and lengthening of the strings. Of course the reverse situation can also occur, causing shortening of the strings. Depending upon their length, the lengthening or shortening of strings of plastic conduit can be considerable. The coefficient of thermal expansion for PVC, a synthetic polymer material commonly used in the air distribution conduits of wastewater aeration systems, corresponds to a ⅜ inch (0.95 cm) change in length for every 10° F. (5.6° C.) change in temperature per 100 feet (30 m) of string length. Thus in this example, the change in length of a 100 ft. (30 m) long string would be 3.75 inches (9.5 cm).

Upon expansion or contraction of a long gas distribution conduit string having two or more fixed stands spaced from one another along the length of the string, the stands tend to resist increase and decrease of the length of the intervening portion of the string. This in turn produces contention between the string, the stands and the floor. Such contention is potentially destructive to the conduits, stands and anchors, and to the gas tight sealing integrity of couplings and other components of the conduit network. Thus, in order to eliminate this contention, it has become standard practice to provide expansion joints at spaced intervals within gas distribution conduit strings.

Because of the purchase and installation costs of fixed stands, it has not been common practice to provide a fixed stand for each segment in a string. Thus, for example, in strings of 20 foot (6 m) segments, it has been common practice to provide fixed stands at approximately 40 foot (12 m) intervals. The conduit connections not served by expansion joints are typically provided with so-called "plain" couplings that do not accommodate expansion or contraction. Thus, in grid type conduit strings substantially exceeding 40 feet (12 m), it has been common to have pairs of conduit segments that are joined by plain couplings. FIG. 3 exemplifies this type of practice. It includes four expansion joints 52, 53, 54 and 55. Each of them interconnects two adjacent gas distribution conduit segments, but these joints alternate with plain couplings 16.

For purposes of this example, joint 52 is representative of the other expansion joints and their connections, and interconnects first and second segments 23 and 24. One end of expansion joint barrel 56 has a rigid connection with one end of segment 24. The other end of barrel 56 encloses segment 23 in gas-tight telescoping relationship.

Retainer ring 57 holds in place an internal O-ring or other suitable sealing member (not shown) which bears against the exterior surface of segment 23 within the expansion joint and provides a gas tight seal while permitting longitudinal sliding motion of the end of segment 23 within and relative to barrel 56. The length of barrel 56 and the amount of segment 23 that is enclosed thereby are selected to provide sufficient room for anticipated expansion of the portion of the string served by joint 52, but the amount of conduit enclosed by the joint must also be of sufficient length so that any anticipated contraction will not disengage the segment from the sealing member or joint.

Typically, the distances between fixed stands are sufficient so that the intervening intervals of string length require added vertical support. This may for example be provided by line stands of the sliding type. They locally maintain the portions of the string to which they are attached in a substantially fixed position at least vertically and preferably also laterally, but do not prevent motion of the string about or along its longitudinal axis.

For example, an illustrative sliding line stand 62 includes a base 63 having an anchor 64 and a leg 65 supporting a collar 66 that surrounds the outer surface of conduit segment 23. There is a loose sliding fit between the segment outer surface and the interior of collar 66 which permits the portion of the string supported by collar 66 to move longitudinally relative to the tank floor during expansion and contraction of the string.

For the purpose of simplifying FIG. 3, it shows only a portion of the many diffusers 18 which may and normally would be present on the gas distribution conduit string 17. Each of the plural diffusers borne by a given conduit segment may be fixedly secured to that segment. Leveling the diffusers can be an important factor in the installation of the diffusers and conduit segments. Proper alignment of the segments and diffuser gas discharge surfaces is typically sought through relative rotation of the segments about their longitudinal axes during installation of the plain couplings and expansion joints which connect the conduit segments.

Some diffusers are symmetrical. The SANITAIRE diffuser has diffusion element holders that are symmetrical and are cemented to the conduit segments in a jig at the factory. Thus, all of the holders secured to a given conduit segment will have their centers of gravity in a common plane that also includes the longitudinal axis of the segment. The remaining parts of the diffusers, including the diffusion elements (ceramic or membrane type), additional element supports (if employed), separate ring type sealing member (if employed) and the retainer ring, are also symmetrical and are symmetrically mounted on the holders.

This design makes it possible to angularly pre-align all of the diffusers on a given conduit segment with one another. When such a segment is precisely installed in a wastewater treatment facility, all of the diffuser centers of gravity will be directly over the longitudinal axis of the conduit segment. Such positioning is a natural consequence of correct installation practice. So long as the diffusers have their centers of gravity neutrally positioned above the conduit axes, the positioning of these centers above the axes will not generate rotational moments in the conduits.

Unfortunately, precise rotational alignment of the conduits is not always attained during installation or may be lost afterwards. This results in the centers of gravities of symmetrical diffusers being offset laterally with respect to the conduit axes, thus generating rotational moments. These are forces that, if not successfully opposed, would tend to cause rotation of the pipe around its longitudinal axis and corresponding rotation of the diffusers that are secured to the conduit. The tendency for diffusers to create such rotational moments can be present in the grid type systems of other manufacturers, for example those in which the diffusers, by design, are offset laterally relative to the conduit axis.

Rotational moments created in other ways can act on diffusers whether their centers of gravity are laterally offset or not. For example, strong velocity vectors can be imposed on diffusers by uncontrolled and unpredictable water currents that are developed in wastewater merely by discharge of gas from the diffusers. When propeller mixers and other mechanical mixers, pumps and aeration devices are present in the treatment tank, they can also create such vectors. Velocity vectors can also be induced in the aeration tank contents and imposed on the diffusers by the jetting action of return activated sludge lines and by unusually high rates of flow of wastewater into the tank due to heavy rainfall or flooding.

Another source of these velocity vectors is the geometry of tank walls and other components. For example, although many aeration tanks have vertical side walls, others have gently sloping side walls (e.g. a slope of 0.33) with the aeration strings installed only on the flat floor portion. This configuration can cause cross rolling velocity vectors that exert significant lateral forces or overturning moments on diffusers and impose rotational moments on the strings.

Another source of velocity vectors and ensuing rotational moments arises from maintenance of diffusers. Fouling of diffusers is a well known phenomenon and is documented in technical literature such as the U.S. EPA Fine Pore Manual and the WEF Manual of Practice FO-13, entitled "Aeration." One process interrupting method of cleaning fouled diffusers is to drain the aeration tank and use high pressure water jets, typically from the tank top, to hose the foulant from the diffusers. The forceful water jet or stream hitting the diffusers off center and/or at generally oblique angles from heights of 15 feet or greater can cause rotation of the strings and attached diffusers.

Resisting these rotational moments is important. If they are allowed to rotate the gas distribution conduits, the diffusion elements may be tilted far enough so there is a significant difference in hydrostatic pressure between the low sides and the high sides of the tilted elements. This can result in preferential discharge of air through the high sides, decreasing the flux through the low sides and increasing it through the high sides, thus impairing the air distribution patterns of the diffusion elements. Competitors and customers have alleged that misalignment difficulties and ensuing changes in air flux impair the performance of the diffusers. Obviously, it is inconvenient and time consuming for plant operators to return tilted strings to their correct rotational alignment.

Loss of proper axial alignment could be overcome by using a fixed stand for every conduit segment, which would in turn require more expansion joints, but cost factors have deterred use of this approach. Instead, considerable reliance has been placed on such limited frictional resistance as is available from a mix of plain couplings, expansion joints, sliding line stands and fixed stands in order to resist conduit and diffuser rotation and to maintain diffuser alignment. However, due to factors described above it has sometimes been difficult to maintain alignment as dependably as desired. Thus, there remains a need for grid type aeration systems that provide good rotational resistance without impairing the ability of the system to accommodate expansion and contraction of gas distribution conduits.

It has been apparent for a number of years that elimination of aeration string roll-overs resulting from the above factors would be a time- and cost-saving advantage to operators. Notwithstanding the continuing concerns of persons skilled in this art about these issues, no satisfactory solution has yet been found. Wastewater treatment systems generally and grid type systems in particular appear to present unique problems in regard to the joining together of conduit segments for supplying air to diffusers. Continued incidence of the problem of diffuser roll-over bears testimony to the fact that no fully satisfactory solution has been obvious to those of ordinary skill in this art. Thus, there has been an unfulfilled need for improvements in these aeration systems, and the present invention fulfills this need.

SUMMARY OF THE INVENTION

Wastewater Treatment Apparatus With Locking Couplings

This need has been met in part by improvements upon wastewater treatment apparatus which include plural oxygen-containing gas diffusers that must extend substantially horizontally in at least one horizontal direction for proper operation of the diffusers when they are discharging oxygen-containing gas into wastewater in which the diffusers are submerged. The apparatus also includes a plurality of gas distribution conduits that respectively support the diffusers, supply oxygen-containing gas to the diffusers, and have gas-tight gas transmission connections with each other or with manifolds for passage of the gas. At least a portion of these connections are through couplings having first and second matingly compatible coupling sections adapted for relative rotation with respect to each other, at least one locking projection having a fixed position with respect to one of the coupling sections, at least when said coupling is fully made up, and a locking receptacle array including locking receptacles having a fixed position with respect to the other coupling section, at least when the coupling is fully made up. The projection and receptacles are relatively moveable from a non-engaged condition to an engaged condition during make up of the coupling. While the coupling components may be made of any suitable material, it is an advantage and preferred embodiment of the invention that one or both of the coupling sections, and preferably also the projection or receptacles or both, may be formed of synthetic polymeric material. While the gas distribution conduits may be respectively provided with one or more fixed stands and/or with one or more expansion joints if desired, at least a portion of the embodiments of this aspect of the invention have the advantage of reducing or eliminating the need for costly fixed stands and/or expansion joints. Thus, the invention solves the long standing problem of diffuser roll-over, while lessening the capital requirements for diffuser systems. At least a portion of the embodiments of the invention offer the further advantage that during make up of the couplings an installer may readily cause relative rotation of the conduits to align the diffuser gas discharge surfaces substantially horizontally and, with the couplings in made up condition, positively lock the conduits against relative rotation to maintain the gas discharge surfaces in alignment.

Rotationally Locked Gas Distribution Conduits Without Fixed Stands

The invention has made possible wastewater treatment facilities that include rotationally locked gas distribution conduit strings composed of groups of consecutive interconnected segments having no fixed stands positioned in such groups, or at least have fewer fixed stands than were used in prior installations. The invention has also made possible wastewater treatment facilities in which entire rotationally locked gas distribution conduit strings have no fixed stands. Also made possible are wastewater treatment facilities having rotationally locked single segment gas distribution conduits with no fixed stands attached thereto. All such facilities are considered to be part of the present invention. They include plural gas distribution conduits which may be composed of one or a series of interconnected conduit segments that respectively have longitudinal axes, have plural diffusers supported thereon, supply oxygen-containing gas to the diffusers, and have gas transmission connections for passage of the oxygen-containing gas from a source of the gas to the diffusers. Such diffusers must extend substantially horizontally in at least one horizontal direction for proper operation of the diffusers when they are discharging oxygen-containing gas into wastewater in which the diffusers are submerged. Couplings connect gas distribution conduit segments to manifolds and/or to one another. Connection of segments to one another includes the connecting together of all segments or of at least a group of two or more segments representing a portion of the segments in a string. The gas distribution conduits are supported in the liquid-containing portion of a Wastewater tank, above the floor thereof, by stands that permit longitudinal expansion of the single- or plural-segment gas distribution conduits, or of such groups, as a whole. The couplings respectively have first and second matingly compatible coupling sections adapted for relative rotation with respect to each other, at least one locking projection having a fixed position with respect to one of the coupling sections, and a locking receptacle array having a fixed position with respect to the other coupling section and including locking receptacles adapted to engage the locking projection when the coupling is made up. At least a portion of the embodiments of this aspect of the invention have the advantage that the gas distribution conduits may be dependably held in rotational alignment with freedom of expansion and contraction throughout the overall length of the conduits or at least throughout the length of such groups.

Plural Segment Gas Distribution Conduits Without Expansion Joints

The invention has made possible wastewater treatment facilities that include gas distribution conduit strings composed of consecutive interconnected segments, which strings include one or more groups of two or more consecutive segments that have no expansion joints positioned in such groups. The invention has also made possible wastewater treatment facilities in which entire gas distribution conduit strings have no expansion joints. All such facilities are considered to be part of the present invention. They include plural gas distribution conduit strings composed of series of at least two inter-connected conduit segments that respectively have longitudinal axes, have plural diffusers supported thereon, supply oxygen-containing gas to the diffusers, and have gas transmission connections with each other for passage of said oxygen-containing gas from a source of said gas to the diffusers. Such diffusers must extend substantially horizontally in at least one horizontal direction for proper operation of the diffusers when they are discharging oxygen-containing gas into wastewater in which the diffusers are submerged. These strings respectively include couplings which respectively inter-connect all segments in such strings or at least inter-connect groups of at least two consecutive conduit segments in series. These couplings, in made up condition, do not telescope with the segments of their respective strings or groups for expansion and contraction of the segments. Said strings or groups of segments are supported in the liquid-containing portion of a wastewater tank, above the floor thereof. Also, the couplings respectively have first and second matingly compatible coupling sections adapted for relative rotation with respect to each other, at least one locking projection having a fixed position with respect to one of the coupling sections, and a locking receptacle array having a fixed position with respect to the other coupling section and including locking receptacles adapted to engage the locking projection when the coupling is made up. At least a portion of the embodiments of this aspect of the invention have the advantage that the gas distribution conduit strings as a whole, or at least the segments of such groups, may be dependably held in rotational alignment while eliminating the costs and difficulties associated with expansion joints. It is a further advantage and preferred embodiment of at least some embodiments of this aspect of the invention that maintenance of such rotational alignment can be attained without fixed stands positioned in such strings or at least in said groups.

Any suitable locking coupling may be used in practicing the several wastewater treatment aspects of the invention described above. However, the invention also includes a number of types of improved couplings which can be used to particular advantage in these and other wastewater treatment applications. Consideration of the benefits of using these couplings in wastewater treatment suggests that they may possibly be useful in applications in other fields. Examples of these improved couplings are described below.

Seal-Then Lock-Coupling

Such couplings include first and second axially engageable matingly compatible coupling sections having first and second opposed sealing member contacting surfaces. Such surfaces may be integral with, or may be parts of other members connected with or otherwise cooperatively associated with, the respective coupling sections. The first coupling section has an end that is connectable with the second coupling section during make up of the coupling. These sealing member contacting surfaces are positioned in relation to the coupling sections for entering into engagement with and generating compression forces against, when the coupling is in partially made up condition, a sealing member that forms a seal within the coupling prior to or upon full make up of the coupling. There is also at least one locking projection which is in fixed position with respect to one of the coupling sections prior to or upon full make up of the coupling. Also present is a locking receptacle array including locking receptacles that, at least upon full make up of the coupling, are in fixed position with respect to the other coupling section but are in position for the locking projection to pass in and out of registry with a plurality of the locking receptacles during relative rotation of the coupling sections when the coupling is in partly made up condition. Such locking receptacle array is in position for the locking projection to enter a selected one of the plurality of locking receptacles after the sealing member contacting surfaces enter into engagement with the sealing member and during movement of the coupling sections from partially made up condition to fully made up condition. At least a portion of the embodiments of this aspect of the invention have the advantage that an installer may rotate the coupling sections relative to one another during initial engagement of the sealing member with the sealing member contacting surfaces, for example in order to assist with effecting such engagement, and may thereafter further rotate the coupling sections relative to one another to establish a desired rotational alignment between the coupling sections before engaging the locking projection and selected locking receptacle.

Capture, Rotate Then Lock Coupling

Such couplings include a sealing member and first and second matingly compatible coupling sections with sealing member confining and contacting surfaces. The coupling sections are connectable with one another by movement in which the coupling sections advance from partly made up to fully made up condition. At least one locking projection is included in the coupling, and it is in fixed position with respect to at least the first coupling section prior to or upon full make up of the coupling. Also present in the coupling is a locking receptacle array. It includes locking receptacles that, when the coupling is in fully made up condition, are in fixed position with respect to at least the second coupling section, but are positioned for the locking projection to pass in and out of registry with a plurality of the locking receptacles during relative rotation of the coupling sections when the coupling is in partly made up condition. A retaining member is provided that connects said coupling sections to one another in both partly and fully made up conditions. Such member affords freedom of movement of these sections in a range of movement from partly to fully made up condition throughout which the sealing member confining and contacting surfaces are held sufficiently close together to maintain confinement of the sealing member between said surfaces. This range includes positions corresponding to partly and fully made up condition of the coupling in which the locking projection respectively is not and is within a selected one of the plurality of locking receptacles. According to a preferred embodiment of the invention, the coupling sections are engageable by axial movement toward one another. It is also preferred that the retaining member be a threaded ring having a thread which engages a compatible thread on one of the coupling sections and a flange or other projection which engages one or more parts of the other coupling section for drawing said sections toward one another through said range of movement. This aspect of the invention is particularly useful with O-ring sealing members and with couplings whose sealing member contacting or compression surfaces are oriented in such a way that escape of the sealing members tends to occur during attempted rotational adjustment of the partly made up coupling. At least a portion of the embodiments of this aspect of the invention have the advantage that an installer may partially assemble the coupling sections to attain confinement of the sealing member with the sealing member confining and contacting surfaces, apply the retaining member, tighten it to bring the coupling sections into the first position, then, without danger of losing confinement of the sealing member, freely rotate the coupling sections relative to one another to establish a desired rotational alignment between the coupling sections before engaging the locking projection and selected locking receptacle and finally further tighten the retaining member to bring the coupling sections into their second, fully made up position in which the locking projection and selected receptacle are in locking engagement.

Radial Seal Locking Coupling

Conduit couplings of this type include first and second axially engageable matingly compatible coupling sections respectively having first and second opposed sealing member contacting surfaces that are spaced apart in a generally radial direction. Such sealing member contacting surfaces are positioned to enter into engagement with, and to establish at least partly radial compression forces against, a sealing member that forms a seal within the coupling while generating a generally radial counterforce in the sealing member which acts upon the coupling sections during make up of the coupling. Also included in the coupling is at least one locking projection that is in fixed position with respect to at least one of the coupling sections, at least when the coupling is fully made up. There is also a locking receptacle array comprising locking receptacles that are in fixed position with respect to at least the other coupling section at least when the coupling is fully made up. This locking receptacle array, the locking projection and the remaining structure of the coupling sections are so oriented that after establishment of said radial compression forces but prior to full make up of the coupling the locking projection may be caused, through relative rotation of said projections and array and through relative movement of the projection and array in a generally axial direction, to pass through a plurality of rotational positions that are in registry with different locking receptacles in the array and to enter a selected one of the locking receptacles. According to some embodiments of this aspect of the invention, the at least partly radial compression forces and counterforce are exclusively radial or at least primarily radial. In this context, primarily means that the magnitude of the respective components of compression and counter force in the radial direction exceed those in the axial direction. At least a portion of the embodiments of this aspect of the invention have the advantage that, to the extent these forces are radial rather than axial, the counterforce which is generated in the sealing member does not directly counter the axial engaging motion of the coupling sections or the entry of the locking projection into the selected locking receptacle. In certain embodiments in which the coupling sections are drawn together by manual manipulation of a retaining member such as a threaded ring, to the extent that the counterforce is exerted radially against the coupling sections rather than reacting axially against the retaining member, achievement of uniform sealing force from coupling to coupling can be made to depend less on the variable strength of different installers and to a greater extent on the relatively uniform dimensions of the coupling sections.

Short Projection Locking Couplings

This type of coupling, which is useful for rotational alignment and connection of conduits, includes first and second axially engageable matingly compatible coupling sections that are not portions of the conduits and are formed at least in part of synthetic polymeric material, as well as first and second sealing member contacting surfaces. These sealing member contacting surfaces and at least one sealing member are positioned in the coupling to form a seal within the coupling. The sealing member or members have dimensions of both generally axial length and radial height, when viewed in section in a plane which includes the member central axis or axes. At least one locking projection is present which is in fixed position with respect to one of the coupling sections, this locking projection being formed of synthetic polymeric material, extending at least partly in a generally axial direction, having an axial dimension which is less than the axial length of the sealing member, and having a predetermined thickness measured in a generally peripheral direction in the coupling. There is also a locking receptacle array including locking receptacles in fixed position with respect to the other coupling section. Adjacent locking receptacles have common walls formed of synthetic polymeric material and with predetermined thickness measured in a generally peripheral direction in the coupling. This array extends with its receptacles distributed in a generally peripheral direction across a given angular interval about a central axis of the coupling and is positioned so that a different locking receptacle in the array is in registry with the locking projection for each of a plurality of different relative rotational positions of the coupling sections. Also, the locking receptacle array is oriented so that the locking projection may, on establishment of a desired relative rotational alignment of conduits connected by the coupling, enter at least one selected locking receptacle. According to preferred embodiments, the axial dimension of the locking projections is up to about 0.5, more preferably up to about 0.3 and still more preferably up to about 0.2 of the axial length of the sealing member. At least some of the embodiments of this aspect of the invention have the following advantages. The restricted length of the locking projection can restrict the amount of flexural stress that is exerted on the synthetic polymeric material of the projection and of the walls of the selected locking receptacle by interaction between these parts in response to forces tending toward relative rotation of the coupling sections when the coupling is fully made up. This in turn makes it possible to limit the thicknesses required in the locking projection and/or in the walls of the locking receptacles to resist such forces. It follows that this coupling can afford opportunity for the presence, within a given angular interval extending in the peripheral direction, of synthetic polymeric projections and/or receptacle walls that are closely spaced but also of adequate strength to resist the forces. This in turn can make possible a coupling for rotational alignment and connection of conduits which has a robust locking feature in combination with fine increments of angular adjustment of conduits connected by the coupling. Where couplings corresponding to this aspect of the invention are employed to join gas distribution conduit segments to manifolds and/or to other such segments, and diffusers or diffuser holders have been pre-fitted to the segments, the fine adjustment abilities described above make it unnecessary to rotationally align the locking projections of the couplings with the vertical axes of the diffusers when affixing the coupling sections to the segment ends.

Fewer Projections Than Receptacles

This aspect of the invention is a conduit coupling useful for rotational alignment and connection of conduits and includes first and second axially engageable matingly compatible coupling sections. It has a locking projection array comprising a plurality of locking projections, of molded material, having a fixed position with respect to at least one of the coupling sections at least when the coupling is fully made up. The locking projection array extends with its projections distributed in a generally peripheral direction across a given angular interval about a central axis of the coupling. There is also a locking receptacle array including locking receptacles, of molded synthetic polymeric material. It has a fixed position at least with respect to the other coupling section at least when the coupling is in a fully made up condition. Such array extends with its receptacles distributed in a generally peripheral direction across a given angular interval about a central axis of the coupling and is positioned so that at least two different locking receptacles in the locking receptacle array are in registry with at least two locking projections for each of a plurality of different relative rotational positions of the coupling sections. The number of locking projections is at least about 20% less, more preferably at least about 50% less and still more preferably at least about 75% less than the number of locking receptacles in the respective arrays. With this arrangement, the probability that the available projections can fully engage the receptacles that they confront can be increased, notwithstanding the possibility that one or more receptacles may be inadvertently damaged or plugged with dirt in the field. At least a portion of the embodiments of this aspect of the invention have the advantage that, for a given magnitude of allowable manufacturing tolerances for peripheral distance between projections and/or receptacles, groups of manufactured couplings will exhibit a reduced average number of different relative rotational positions per coupling in which there are mismatches between confronting projections and receptacles. Where the couplings are for example produced by injection molding from plastic, which is preferred, reduction of the number of mismatches for a given manufacturing tolerance can decrease the criticality of one or more of such factors as, for example, inconsistencies between the mold cavities for the first and second coupling sections, differences between multiple mold cavities for the same section of the coupling and plastic shrinkage properties. This reduces the level of precision and therefore cost involved in making the molds.

BRIEF DESCRIPTION OF THE DRAWINGS

FIG. 8 is a transverse section of the coupling of FIG. 6, on section line 8—8, with parts removed.

FIG. 9 is a transverse section of the coupling of FIG. 6, on section line 8—8, with parts removed.

FIG. 10 is an enlarged and exploded partial perspective view of parts of the coupling of FIG. 6.

FIG. 11 is a transverse section of one of the diffusers of FIG. 5.

FIG. 13 is a longitudinal section of a third embodiment of locking couplings useful in the improved wastewater aeration system of FIG. 4, FIGS. 13A and 13B being enlarged partial transverse sections of the coupling of FIG. 13, on section lines 13A—13A and 13B—13B respectively, and FIGS. 13A' and 13B' being similar to FIGS. 13A and 13B except that they disclose alternatives to the forms of projections and receptacles in FIGS. 13A and 13B.

FIG. 14 is a longitudinal section of a fourth embodiment of locking couplings useful in the improved wastewater aeration system of FIG. 4, FIGS. 14A, 14B, 14A' and 14B' being enlarged partial transverse sections of the coupling of FIG. 14 that are similar to FIGS. 13A, 13B, 13A' and 13B'.

FIG. 16 is a longitudinal section of a sixth embodiment of locking couplings useful in the improved wastewater aeration system of FIG. 4, FIG. 16A being an enlarged partial transverse section of the coupling of FIG. 16 taken along section line 16A—16A, and FIG. 16B being an enlarged partial section of the coupling of FIG. 16A taken along section line 16B—16B.

VARIOUS AND PREFERRED EMBODIMENTS OF THE INVENTION

Figure 1:
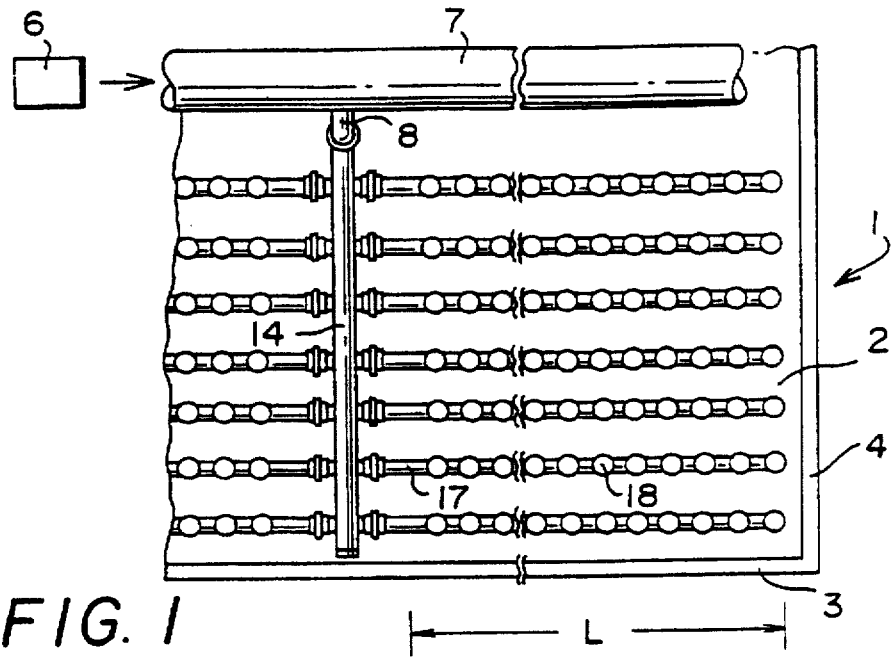
FIG. 1 is a schematic plan view of a prior art wastewater aeration system.
Figure 2:
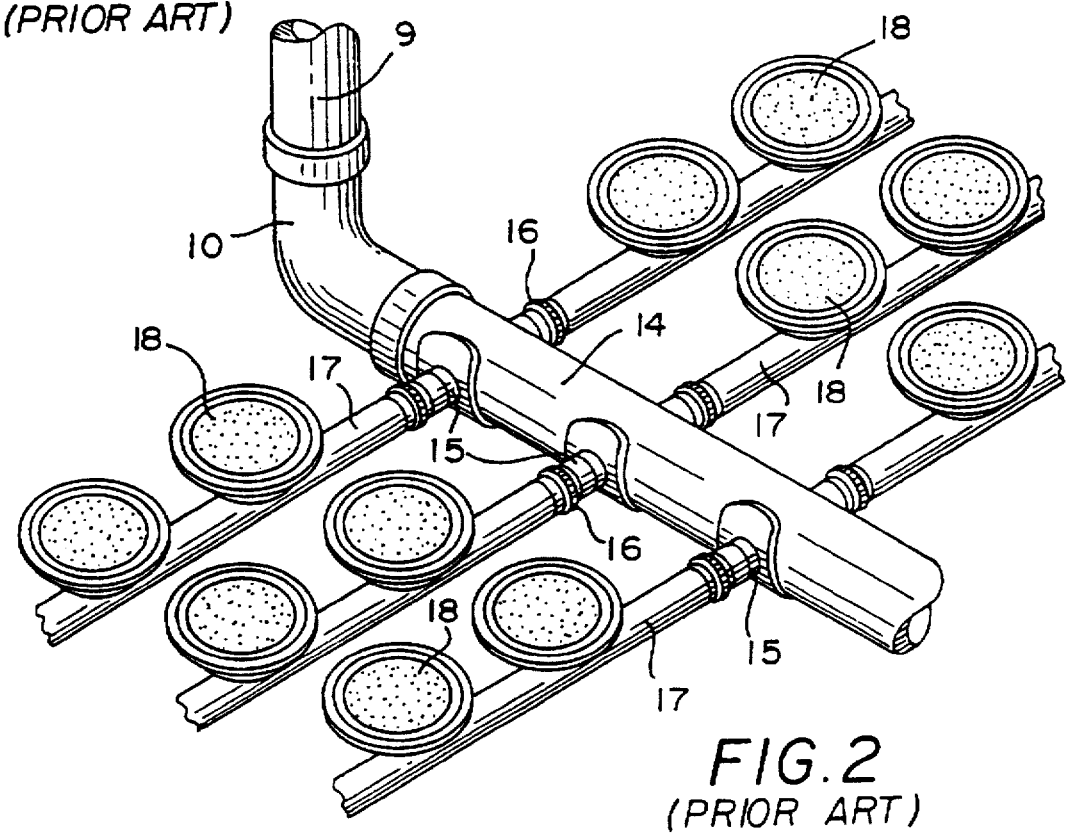
FIG. 2 is an enlarged view, in perspective, of a portion of FIG. 1.
Figure 3:
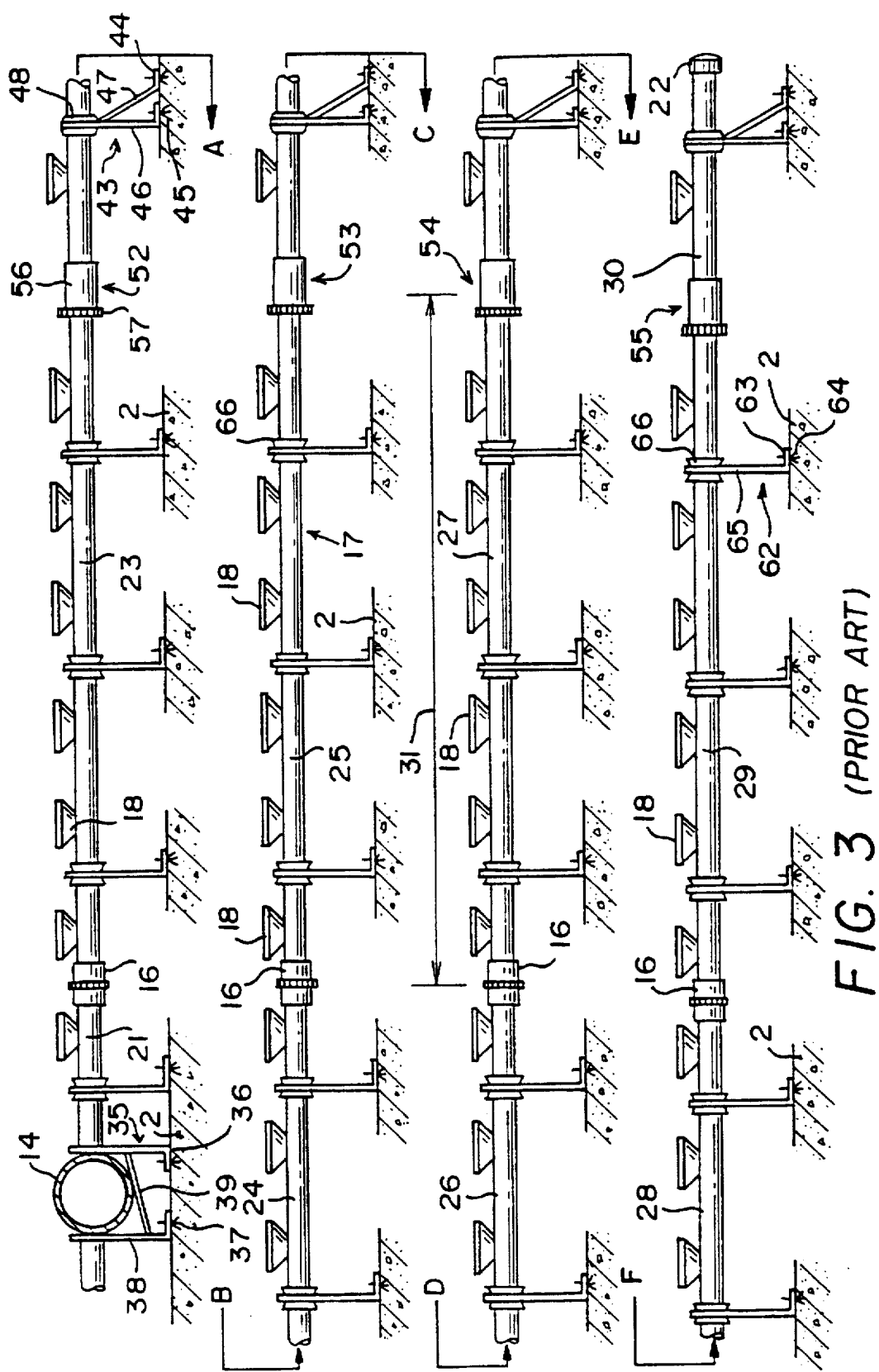
FIG. 3 is a more complete schematic representation, in side elevation, of portions of FIGS. 1 and 2.
Figure 4:
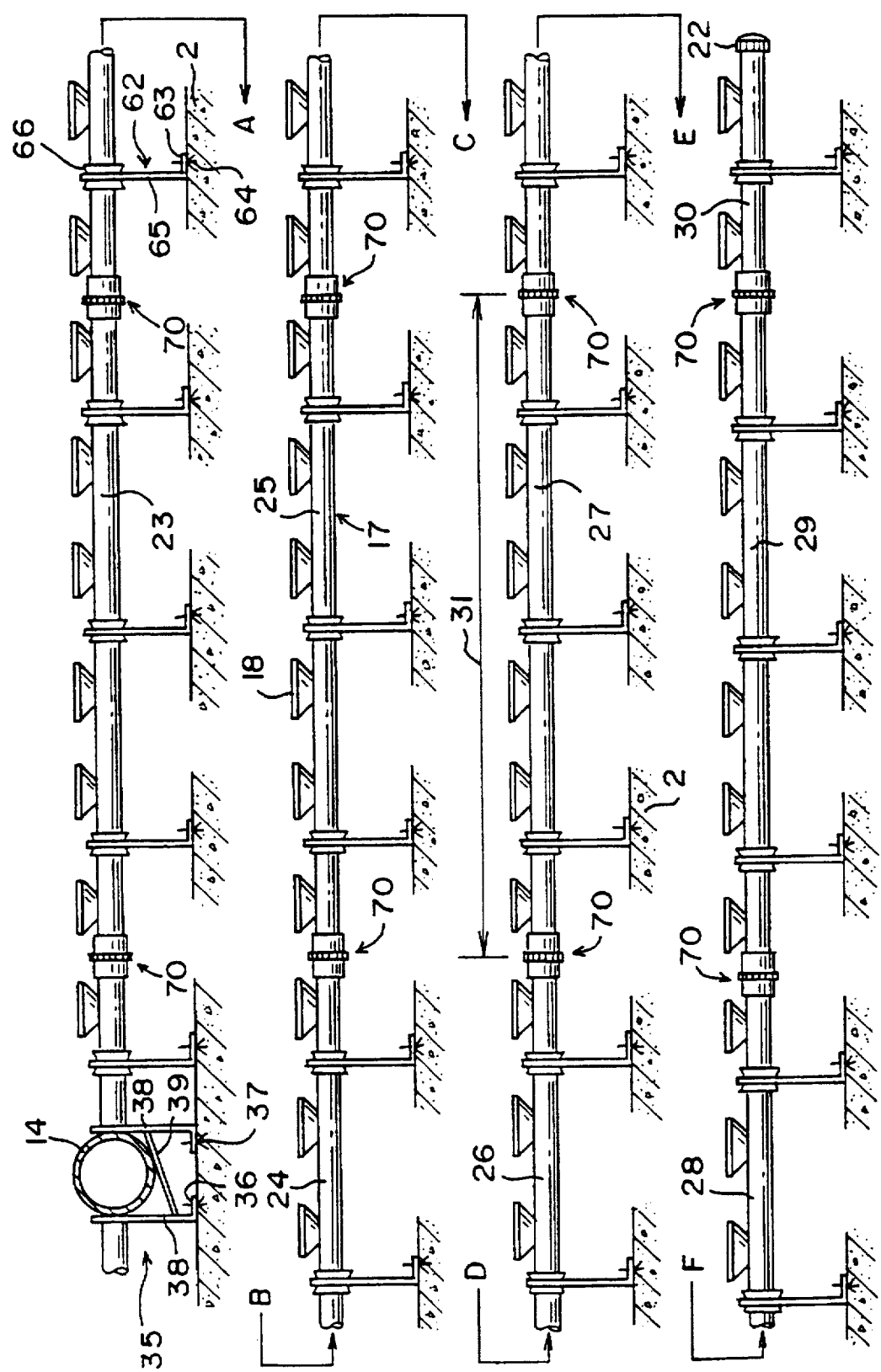
FIG. 4 is similar to FIG. 3, but discloses an improved wastewater aeration system according to the invention.

FIG. 4, which discloses a preferred embodiment of a wastewater aeration system in accordance with the invention, is similar in some respects to FIG. 3. More particularly, FIG. 4 discloses a wastewater aeration system having a tank 1, floor 2, sidewall 3, end wall 4, air main 7, upper elbow 8, downcomer 9, lower elbow 10, manifold 14, nipples 15, gas distribution conduit 17 and diffusers 18 like those disclosed in FIGS. 1–3. Conduit 17 has an end cap 22, conduit segments 23-30 and sliding line stands 62, all as illustrated in FIG. 3. However, according to this embodiment of the invention, special locking couplings 70 are substituted for the plain couplings 16 of FIGS. 1–3.

In most embodiments, the locking couplings will be installed in a plant having for example one or more aeration tanks each having one or more air mains 7, one or more manifolds 14 with their own respective downcomers and elbows, at least about 100 diffusers 18, at least about 25 or at least about 40 gas distribution conduits 17 from which the diffusers protrude and at least about 50 or at least about 100 of the locking couplings 70. In most instances, each gas distribution conduit 17 will be composed of at least one and more typically a string of two, three, four, five or more pipe segments. At least some and preferably all of the segments will be connected by the couplings 70. Each string 17 will preferably connect to a manifold 14 through a coupling 70.

Couplings 70, a number of alternative embodiments of which will be described in greater detail below in connection with FIGS. 5–17A, include engaging projections and receptacles that prevent relative rotation of the adjacent conduit segments which they interconnect. When some or all of the couplings in a given conduit string are of this type, which is preferred, it is possible to maintain the desired alignment of the diffusers with a reduced number, or without any, of the fixed stands that grasp segments firmly to prevent their rotation. Replacement of fixed stands with sliding stands as shown in FIG. 4 reduces expenditures for purchase and installation of stands. This benefit applies for example to conduit strings having only one segment connected to a manifold and to strings having two or more segments connected together in series.

Elimination of part or all of the fixed stands intermediate the manifolds and end caps of gas distributor conduit strings reduces or obviates the need for expansion joints, which can in some cases be more difficult to install correctly than the special couplings 70 that will be illustrated hereinafter. According to the most preferred embodiment of this aspect of the invention, in which the entire length of the gas distributor conduit intermediate the manifold and the opposite end of the string is free of fixed stands and expansion joints, the string may freely expand and contract in the sliding stands, thereby eliminating all contention between the string, stands and tank floor. The result is a more reliable and less costly grid type aeration system, in which the desired alignment of the diffusers may be readily attained and preserved over long periods of operation in the face of the force vectors and rotational moments described above.

Referring now to FIGS. 5–17A generally, it will be seen that they disclose a variety of locking couplings 70, each of which is useful in the apparatus of FIG. 4, and each of which has a number of elements in common with the others. Thus, in each of these embodiments, there is a first conduit segment 74, which may be any suitable conduit segment. For example, such segment may be similar to the short length of conduit 21 shown in FIGS. 3 and 4, or may be a full gas distribution conduit segment similar, for example, to segment 23 of FIGS. 3 and 4. Each embodiment also includes a second conduit segment 75, which may for example be similar to the second conduit segment 24 of FIG. 4. In some instances the conduit segment of the present invention may not be a "conduit" in the narrow sense of that word, in that the conduit segment could be a fitting, such as a coupling, elbow or the like, which is attached in fluid-transmitting relationship with the coupling.

Other common elements found in these embodiments include a first matingly engageable coupling section 78 having a first conduit receiver 79 of cylindrical or other suitable cross-section to receive the conduit segment 74 and a first sealing member contacting surface 80 of any suitable shape. There is also a second matingly engageable coupling section 83 with second cylindrical conduit receiver 84 of cylindrical or other suitable cross-section for second conduit segment 75. A second sealing member contacting surface 85 of any suitable shape engages a sealing member 88 having a shape compatible with the surfaces 80, 85 and adapted to form a seal between those surfaces.

One of the coupling sections includes or is otherwise associated with at least one locking projection 91 of any suitable shape. Such projection is in fixed position with respect to its respective coupling section, either by being an integral portion of it, or by being attachable and/or attached to it.

The other coupling section includes or is otherwise associated with a plurality of locking receptacles 92 of any suitable shape. These receptacles are in fixed position with respect to their respective coupling section, either by being an integral portion of it, or by being attachable and/or attached to it. Receptacles 92 may be arranged in an appropriate array of any suitable shape, preferably an arcuate array.

Also, in each embodiment there is a retainer of any suitable kind for holding the coupling sections together in the made up coupling. The retainer may be a part or parts that is or are integral with one or both of the coupling sections and/or may be one or more parts that is/are separate pieces that are attached or attachable to the coupling sections.

Figure 5:
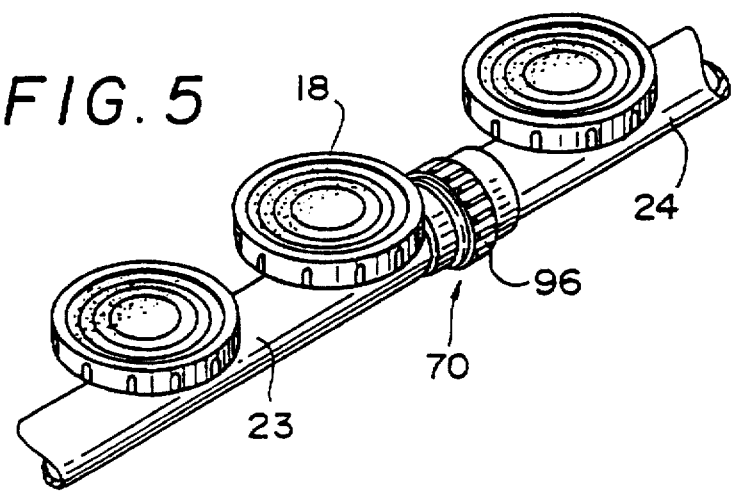
FIG. 5 is a perspective view of a first and particularly preferred embodiment of locking couplings useful in the improved wastewater aeration system of FIG. 4.
Figure 6:
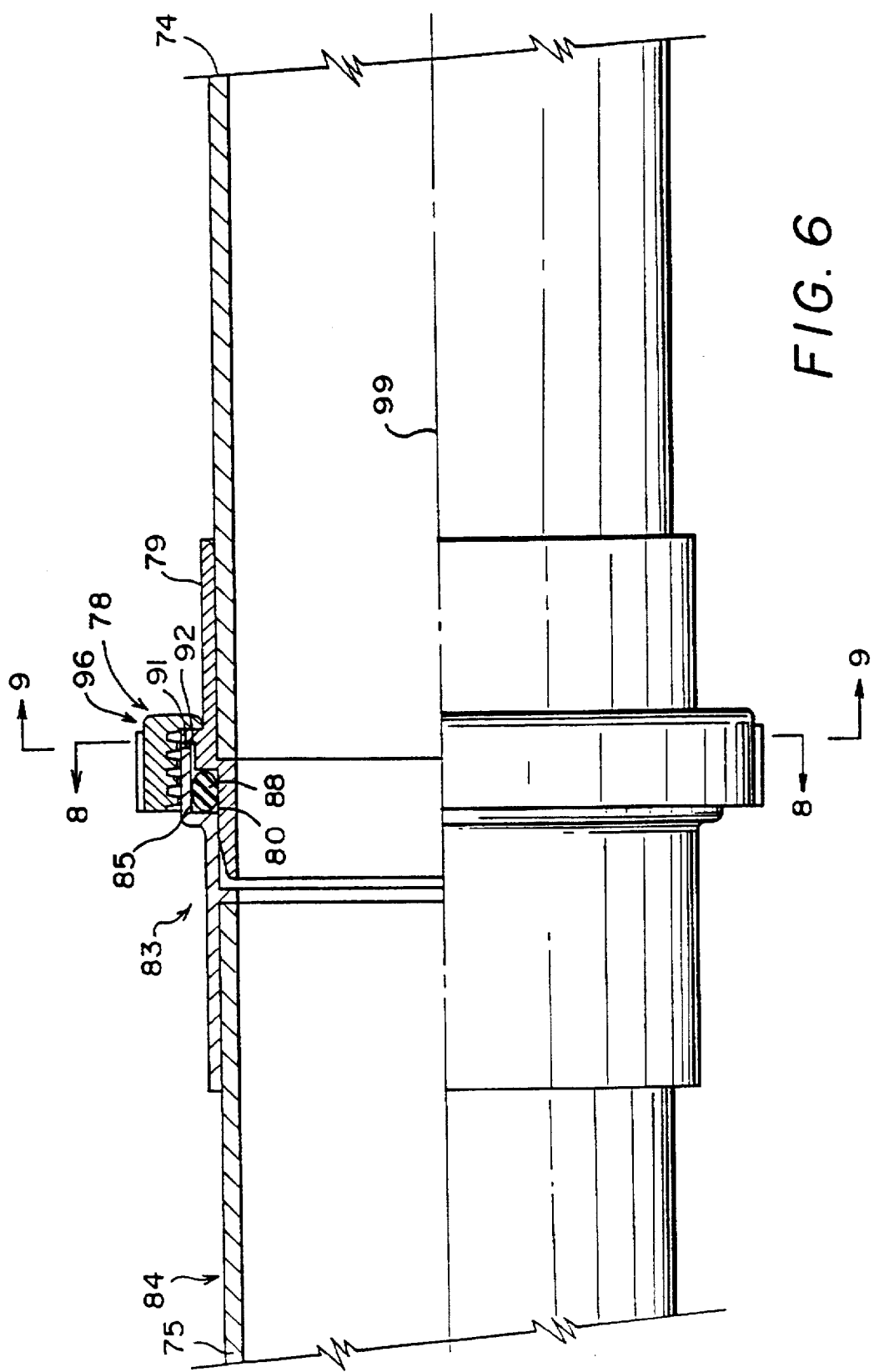
FIG. 6 is a side elevation of the coupling and a portion of the conduit of FIG. 5, partly in longitudinal section.

The embodiment of FIGS. 5–11 is a particularly preferred embodiment of the locking couplings 70. In this embodiment, as shown in FIGS. 5 and 6, the coupling components are arranged around a central axis 99.

This embodiment provides one of the coupling sections in the form of a spigot member, while the other coupling section is in the form of a hub member. In this embodiment, the spigot member is the first coupling section, while the hub member is the second coupling section. However, the foregoing relationships may be reversed.

Figure 7:
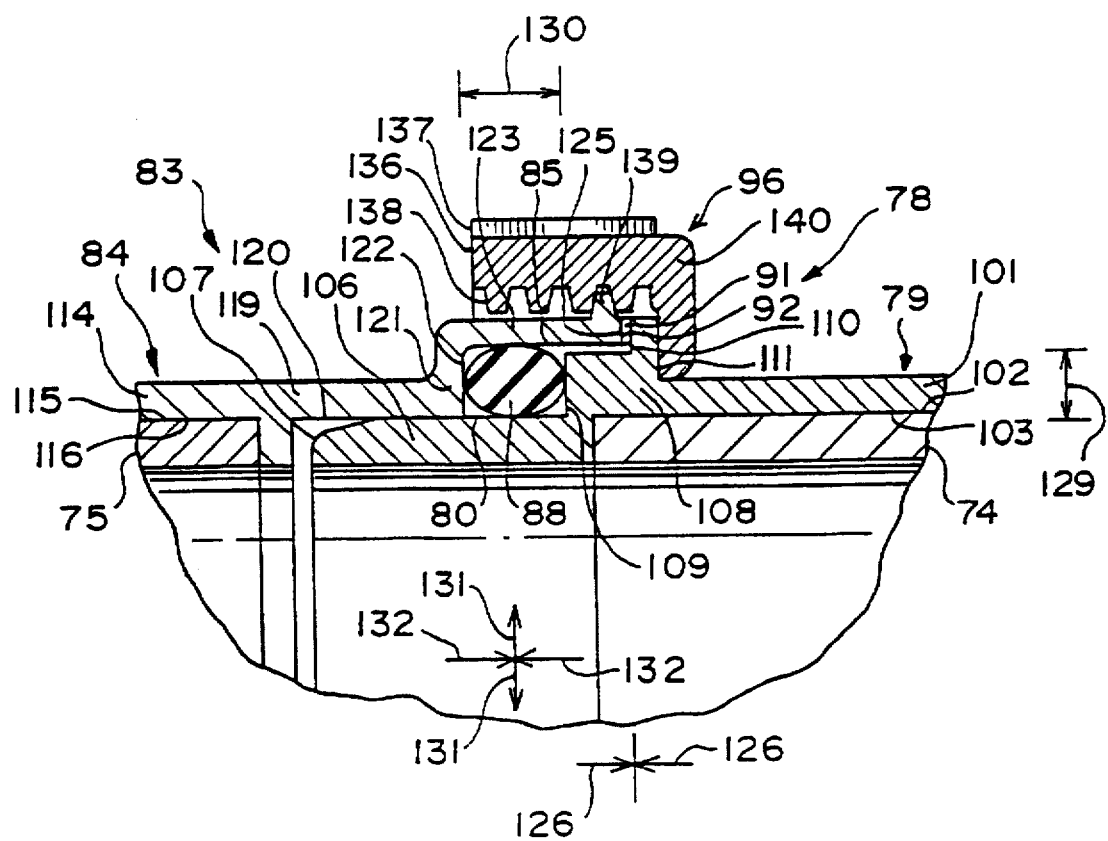
FIG. 7 is a partial enlargement of the section of FIG. 6.

As may be seen in FIGS. 6 and 7, the first section includes a cylindrical collar portion 101 having a cylindrical inner surface 102 for sealingly engaging the cylindrical outer surface 103 of first conduit segment 74, which may, for example, be similar to the short length of conduit 21 shown in FIG. 3 or may be a full segment similar to gas distribution conduit segments 23–30. The remainder of the first coupling section includes a cylindrical male portion 106, insertable in the second coupling section, and having a bevelled nose 107 to facilitate insertion. The sealing member contacting surface 80 of this coupling section is a cylindrical outer surface of male portion 106. A stepped transition portion 108 integrally joins collar portion 101 and male portion 106 and has an inward facing vertical annular step surface 109, an inward facing vertical slotted surface in which may be found the slots representing the receptacles referred to above, and an outward facing annular vertical planar retaining surface 111.

Second coupling section 83, like first coupling section 78, includes a cylindrical collar portion 114 having a cylindrical inner surface 115 for sealingly engaging the cylindrical outer surface 116 of second conduit segment 75. To afford opportunity for insertion of male portion 106, the remainder of second coupling section 83 includes a cylindrical female portion 119 having a cylindrical inner surface 120 of such diameter as to provide close fitting engagement with the diameter of male portion 106. A stepped, radially extending transition portion 121, having inward facing vertical annular step surface 122 connects female portion 119 with a cylindrical bell portion 123. The sealing member contacting surface 85 of this coupling section is a cylindrical inner surface of bell portion 123. Outward facing annular vertical planar ribbed surface 125, formed on a free end of bell portion 23 provides a foundation for a plurality of projections 91 which are discussed in greater detail below in connection with FIGS. 8–10. The locking motion of these projections with respect to the slots in slotted surface 110, which occurs in a generally axial direction, is indicated by arrows 126.

The preferred synthetic polymeric material for the coupling sections, locking projections, locking receptacles and retainer is PVC (polyvinylchloride polymer), but ABS (acrylonitrile-butadiene-styrene polymer) or any other polymeric material having proper strength and environmental properties may be used. Representative physical properties for the currently preferred PVC material are tensile strength of about 7,300 PSI per ASTM (American Society for Testing Materials) specification D-638, tensile modulus of about 410,000 PSI per ASTM D-630, flexural strength of about 13,000 PSI per ASTM D-790 and flexural modulus of about 420,000 PSI per ASTM D-790. It should be understood however, that these are merely preferred values not intended to rule out use of PVCs and other materials with different but adequate properties. Materials of construction other than plastic may be used to construct portions of the couplings or the entire couplings. For example, couplings may be cast from metals such as stainless steel.

In the present embodiment, the sealing member is an O-ring of generally round cross-section. It is preferably resilient (e.g. elastomeric), is preferably of synthetic polymer material, and is preferably compressible by the sealing member contacting surfaces to form a substantially gas tight seal. A preferred elastomer material is natural rubber, which is currently preferred, synthetic rubber, a synthetic-natural rubber blend or an EPDM elastomer, having a low (e.g. 10% maximum) loss in tensile strength on oven aging per ASTM D-1414, an oven aged elongation loss of 15% maximum per D-1414, a Shore A durometer of about 40 to 45, a low water absorption, e.g. about 1.2% maximum by ASTM D-1414 and a low compression set, e.g. about 5– 15% maximum compression set by Method B-1414 of ASTM D395.

By way of example and not limitation of the invention, the O-ring may be a torus having as its dimensions (not compressed) 4.52 inches (11.5 cm) in mean diameter (measured at the mean diameter of its inner and outer circumferences), 14.193 inches (36.05 cm) in circumference (measured as above) and 0.325 inches (0.83 cm) in cross-sectional diameter. Again, without intention of limiting the invention, the compressed dimensions of the sealing member will include a circumference of about 14.077 inches (35.76 cm), a height 129 in a generally radial direction of about 0.268 inches (0.68 cm) (representing a radial compression of about 17.5% and a circumferential compression of about 0.8%) and a corresponding length 130 representing expansion generally in the coupling axial direction.

Radial compression of the sealing member is a preferred mode of compression in the present embodiment, and such compression generates in the sealing member a radial counterforce symbolized by arrows 131, which counterforce is applied to the coupling sections at least in a generally radial direction. Instead of radial compression, the O-ring may be placed under axial compression. However, it is preferred that the O-ring cross-section be placed under both radial and axial compression. Axial compression produces in the sealing member an axial counterforce symbolized by arrows 132 which is applied to the coupling, at least in a generally axial direction. Where there is both radial and axial compression, it is preferred that the amount of axial compression be substantially less than that in the radial direction.

Although less preferred, it is possible to accommodate larger tolerances in the coupling parts and thus reduce manufacturing costs, by omitting axial compression. This has been done in the current commercial product by designing the coupling parts to provide, in the fully made up couplings, small clearances between the sealing members and the coupling surfaces that are axially adjacent thereto, such as the vertical annular step surface 109 and the vertical annular step surface 122 that are shown in FIG. 7.

The retainer 96 of the present embodiment is a retaining ring for urging coupling sections 78 and 83 together. It includes a cylindrical peripheral portion 136 having external, axially extending traction ribs 137 on its exterior and a female thread 138 on its interior. Such female thread is threadingly compatible with a circumferential male thread 139 which may be formed on either of the coupling sections but in this case is provided on second coupling section 83. Flange 140, which may for example be integrally formed with peripheral portion 136, traction ribs 137 and female thread 138, extends radially inward to grasp coupling section 78 by bearing against its retaining surface 111.

While, in certain embodiments of the invention, a single locking projection will suffice, in this embodiment, there is an array containing a plurality of locking projections 91. This array may be arranged in any suitable pattern, but an arcuate pattern is preferred and illustrated in FIGS. 8 and 10. The pattern of projections in such an array may subtend or traverse an angular arc 143 extending in a generally peripheral direction 144 about the central axis 99 of the coupling. Angular arc 145 may be of any number of degrees which is sufficient, in relation to the angular arc 150 traversed by the array of receptacles 92 (discussed below), to provide the desired range of rotational adjustment between conduit segments 74 and 75. However, in the preferred embodiment shown in FIGS. 8, an array of projections uniformly spaced throughout a full circle or angular interval of 360 degrees is employed.

Previously, the preferred number of projections in such an array was 12, but that number has been increased to 24. Although limiting the proportion of projections relative to receptacles can minimize mismatches between confronting projections and receptacles, increased numbers of projections of a given size tend to increase the torque resistance of the preferred couplings. Increased numbers of projections can be particularly beneficial in dealing with axial angular misalignment of coupling sections having integrally formed projections and receptacles. For example, if multiple projections and receptacles are both distributed about a full circle, coupling axial misalignment, depending on its extent, may prevent some or many projections from engaging receptacles. To some degree, lengthening the axial dimensions of the projections and thus bringing more of them into play may contribute to axial misalignment resistance, but the lengthening of the projections must be balanced off against any resultant decrease in bending resistance occasioned by lengthening the projections, and such decrease may prove to be a limiting factor in utilizing increased projection length. Thus, in any given system, the best results are likely to be attained with a coupling in which the number of projections is selected to limit the proportion of projections to receptacles while providing a sufficient number of projections of balanced length to resist the maximum axial misalignment and maximum torque to be exerted on any coupling in the system. In systems of the general type illustrated by FIG. 4, axial misalignment and the requirement for torque resistance can be at their greatest at the coupling closest to the manifold 14.

In this embodiment, the plurality of locking receptacles is an array of receptacles 92 arranged in a pattern compatible with the locking projection pattern. Here again, any suitable pattern may be utilized, but an arcuate pattern is preferred and is shown in FIGS. 9 and 10. The locking receptacle pattern subtends or traverses an angular arc 148 extending in a generally peripheral direction 149. Angular arc 148 may contain any number of degrees sufficient to provide the desired range of relative rotational adjustment between conduit segments 74 and 75. Angular arc 150 may be of any number of degrees which is sufficient, in relation to the angular arc 145 traversed by the array of projections 91 (discussed above), to provide the desired range of rotational adjustment between conduit segments 74 and 75.

In the present embodiment, the size of angular spacing interval 150 of receptacles 92 determines the fineness of the increments of angular adjustment (X°) which may be obtained when relatively rotating connected conduit segments, such as for levelling diffusers. Representative values for X are about 10 or less, more preferably about 5 or less and most preferably about 3 or less.

As best seen in FIG. 10, locking projections 91 have an axial dimension 154 and a predetermined thickness 155. Adjacent locking receptacles may have common walls, such as representative common wall 156 having a first wall surface 157 and a second wall surface 158, which are respectively part of two adjacent locking receptacles. When the receptacles do have common walls, the thickness of those walls, measured in a peripheral direction, may vary from one another. However, according the present preferred embodiment, the locking receptacles 92 have common walls characterized by a substantially uniform thickness, measured at the radially inward edge of slotted surface 110.

Receptacles 92 also have an axial dimension 160 which may be shorter than, equal to or greater than the axial dimension 154 of the projections. Preferably, dimensions 154 and 160 are about the same. In this embodiment, the axial dimension of the projections is 0.025 inches (0.064 cm) and the corresponding axial depth of the receptacles is 0.025 inches (0.064 cm).

The widths of the receptacles 92 may be slightly less than the predetermined thickness 155 of the locking projections 91, to provide an interference fit. However, it is preferred that the locking receptacle widths be at least about the same as the projection thickness 155. More preferably the receptacle width is greater than the projection thickness 155.

The amount of this difference between projection thickness and receptacle width is affected by the radial distance between the coupling central axis 99 and the location of the projections and receptacles, and thus will vary with the diameter of the coupling. This difference is considered in designing molds when, according to preferred practice, the coupling sections and/or other members on which the projections and receptacles are formed or mounted are injection molded. For design purposes, the molds are preferably dimensioned so that the amount of this difference would, if the design were faithfully reproduced in the molded parts, result in a small back and forth movement of the projections and receptacles in a radial direction, the range of such movement preferably being about 1.5° or less and more preferably about 1° or less. For example, in a coupling for 4 inch (10 cm) (nominal) conduit configured in accordance with FIGS. 5–10, in which the radial distance between the coupling central axis 99 and inner diameter of the projection and receptacle arrays is 2.35 inches (6 cm), the projection and receptacle widths in the peripheral direction are respectively 0.038 inches (0.097 cm) and 0.072 inches (0.183 cm), which results in a difference of 0.034 inches (0.086 cm).

The couplings of FIGS. 5–19A are used to connect any type or types of conduits for which there is need to maintain them in a predetermined relative rotational or angular relationship. This includes "plain" conduits, those which have no items mounted thereon, as well as conduits which do have items mounted thereon, for example items which create relative rotational moments in the conduits. A preferred application is the connecting of conduits when at least one of them has a plurality of any kind of gas discharge device, and especially any kind of waste water treatment diffuser, mounted thereon. By way of example, FIG. 11 provides a transverse cross-section of the SANITAIRE diffuser previously discussed in connection with FIGS. 1 through 5.

While such a diffuser may contain a membrane type diffusion element, it preferably includes a ceramic diffusion element 163, as shown, having an air emission surface 164, and has a center of gravity 165 at an elevation well above the longitudinal axis 166 of conduit segment 75. If the center of gravity 165 is not directly above the conduit longitudinal axis 166, i.e. is laterally displaced, this displacement creates a rotational moment 167. As previously explained, such rotational moments and/or other forces exerted upon diffusers may cause them to induce rotation of the conduits to which they are attached, thereby impairing the flux distribution across the air emission surface 164. However, the adjusting and locking capabilities of the present invention afford an opportunity for levelling of the air emission surfaces 164 by relative rotation of the conduits during coupling makeup, and for retention of the desired level condition through the locking capabilities of the coupling.

The embodiment of FIGS. 5–11 has the further advantage of holding the coupling parts and seal connected while permitting rotation to the desired relation. From the foregoing it may be seen that the invention has also provided a novel method of conduit assembly, including engaging a sealing member between coupling sections, confining the sections while permitting relative rotation thereof, rotating the sections to effect rotational adjustment and finally locking the assembly with a cooperating projection and receptacles. Moreover, if the installer doesn't get the adjustment right at first, he can loosen the coupling sufficiently to rotate to a new position without risk that the parts, especially the seal, will become fully disconnected.

Among the parts and relationships of the FIG. 5–11 embodiment that contribute to these capabilities are the relative shortness of the projections 91 in the axial direction, the thread position and the amount or axial length of thread available in the retaining ring 96 or in the mating male thread 139, the relatively short axial length of sealing member 88, the relatively long length in the axial direction of the female receptacle for the seal, e.g. bell portion 123, the axial length of the male member which engages the inner surface of the sealing member, e.g. male portion 106, and the axial length of that part of the coupling which acts as a follower for the sealing member, e.g. stepped transition portion 108 which, with its inward facing vertical annular step surface 109, adjoins male portion 106.

Thus, in this embodiment, at least one of the threads and the cavity in which the seal is captured are long enough so that as the threads are unscrewed, the locking projections and receptacles can be in a disengaged and rotationally adjustable condition while the seal remains captured in the cavity. Maintaining seal capture in this way avoids the necessity for the major amount of rotation that would be required to reseat the seal if capture were lost.

FIGS. 12–17A show several embodiments which illustrate the fact that the coupling sections, sealing members, projections, receptacles, retainers and other components of locking couplings may have a wide variety of different shapes and relationships with one another. Parts in these figures that have the same reference numerals as parts in previous figures generally correspond in function with the parts of the previous figures, even though the parts may have somewhat different shapes and interrelationships. For example, this is true of the parts of FIGS. 12–17A which are identified as conduit segments 74, 75, coupling sections 78, 83, conduit receivers 79, 84, contacting surfaces 80, 85 and sealing member 88. Other or additional parts in FIGS. 12–17A, which have not been disclosed in FIGS. 1–11, will be discussed below.

Figure 12:
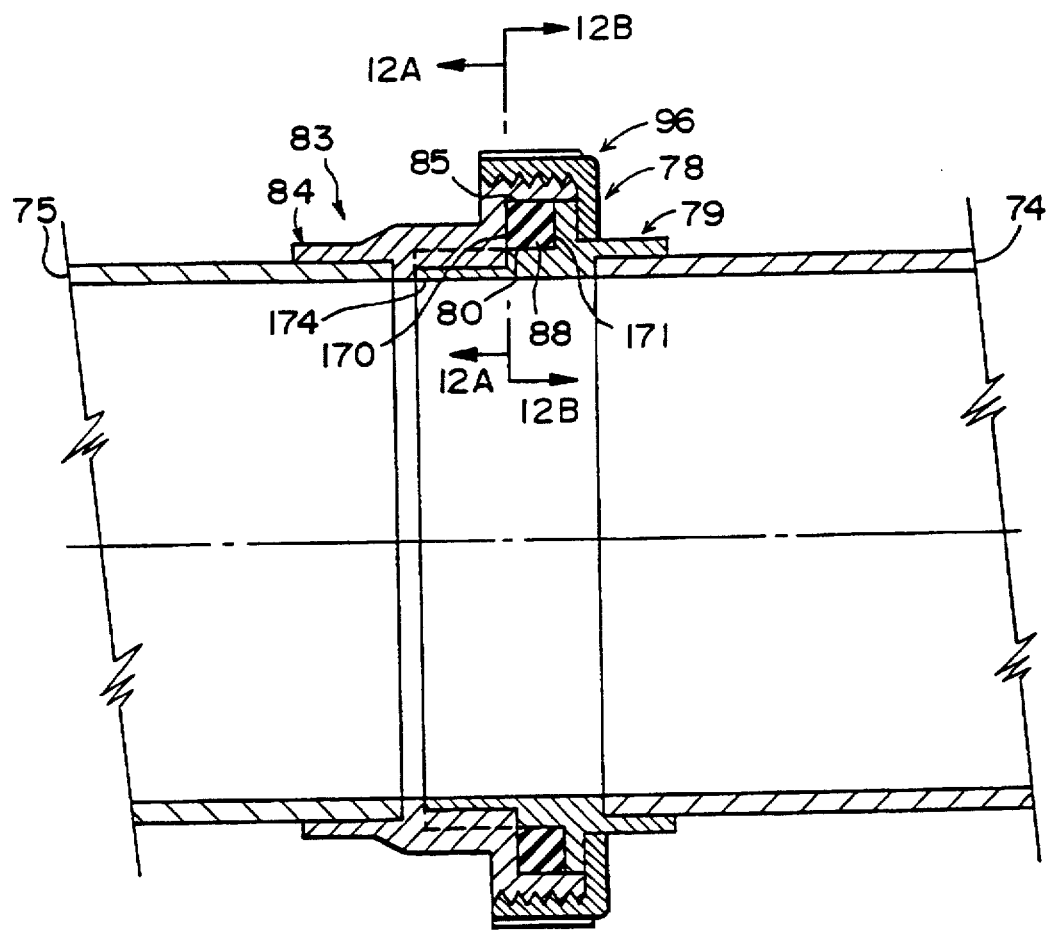
FIG. 12 is a longitudinal section of a second embodiment of locking couplings useful in the improved wastewater aeration system of FIG. 4, FIGS. 12A and 12B being enlarged partial transverse sections of the coupling of FIG. 12, on section lines 12A—12A and 12B—12B, respectively.
Figure 12A:
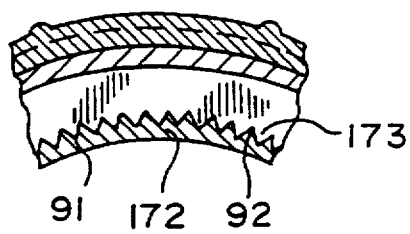
Figure 12B:
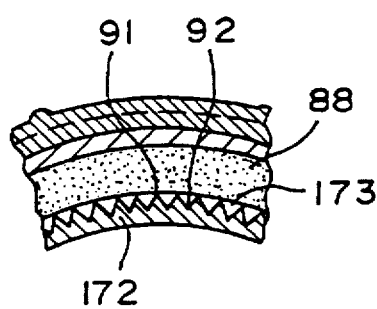

In the embodiments of FIGS. 12, 12A and 12B, in addition to "radial" contacting surfaces 80, 85, which are radial in the sense that their orientation permits them to compress sealing member 88 in a radial mode if desired, the coupling also includes "axial" contacting surfaces 170, 171. Surfaces 80, 85, 170 and 171 may thus be arranged to place the sealing member under axial compression, radial compression or both. Here, the projections 91 and receptacles 92 are in the form of inner 172 and outer 173 sawtooth patterns comprising axially oriented ridges and furrows, peripherally distributed, the inner sawtooth pattern being formed in the projecting nose 174 of first coupling section 78 and the outer sawtooth pattern 173 being formed on the interior of second coupling section 83. The retainer 96 may be a threaded retainer ring as in the previous embodiment, or any other suitable retainer.

FIGS. 13, 13A, 13B, 13A' and 13B' contain one of several embodiments that illustrate, among other things, the fact that the locking projections or receptacles need not be integral components of the coupling sections. In this embodiment, an array of locking projections 91 is formed on the inward facing radially oriented planar face 178 of a projection ring 179. Projections 91 are in an arcuate array so positioned and shaped that it can engage, in a variety of relative arcuate positions, with a corresponding array of receptacles 92 that are formed in an outward facing radially oriented annular planar face 180 on first coupling section 78. FIGS. 13A, 13A', 13B and 13B' show the projection ring 179 separated from the remainder of the coupling. In FIGS. 13A and 13B, the receptacles 92 and projections 91 are respectively shallow cylindrical holes and short, matingly compatible cylindrical stubs. In FIGS. 13A' and 13B' the receptacles 92 and projections 91 are respectively shallow rectangular slots and matingly compatible rectangular spades.

FIGS. 14, 14A, 14B, 14A' and 14B' are similar to FIGS. 13, 13A, 13B, 13A', and 13B', respectively, except that the sealing engagement of sealing member 88 between seal contacting surfaces 80, 85 is entirely axial. It should be appreciated that, although it is not shown in the drawings, the positions of the projections 91 and receptacles 92 in FIGS. 13 and 14 could be reversed. That is, the pattern of projections 91 could protrude from the outward facing surface 180 of the first coupling section and the receptacles could be formed in the inward facing surface 178 of the projection ring, or could pass entirely through the ring.

Projection ring 179 is a full circle in this embodiment but may be split for convenient assembly. Instead of complete rings, arcuate ring segments (not shown), which in the aggregate represent all or less than a full circle, may be substituted for ring 179.

During assembly, the first and second coupling sections 78 and 83 are joined axially and are relatively rotated to establish the desired rotational alignment between them. Bolts 181 are then threaded through holes 182 in ring 179 (or in ring segments if used) and are also threaded through corresponding holes 183 in coupling section 83. At this point, the free ends of projections 91 are near the coupling section planar face 180, but have not penetrated receptacles 92. The conduit segments 74, 75 and their respective coupling sections 78, 83 are then slightly rotated while urging ring 179 toward planar face 180. When the projections and receptacles come into registry, the projections are then seated in the receptacles with an axial locking motion, followed by applying and tightening lock washers 184 and nuts 185 on the ends of bolts 181 which pass through second coupling section 83. To facilitate makeup and adjustment of the coupling, its dimensions and the length of the bolts may be selected so that sealing member 88 need not be placed under axial compression until after insertion of the projections 91 into the receptacles 92.

Figures 15, 15A, 15B:
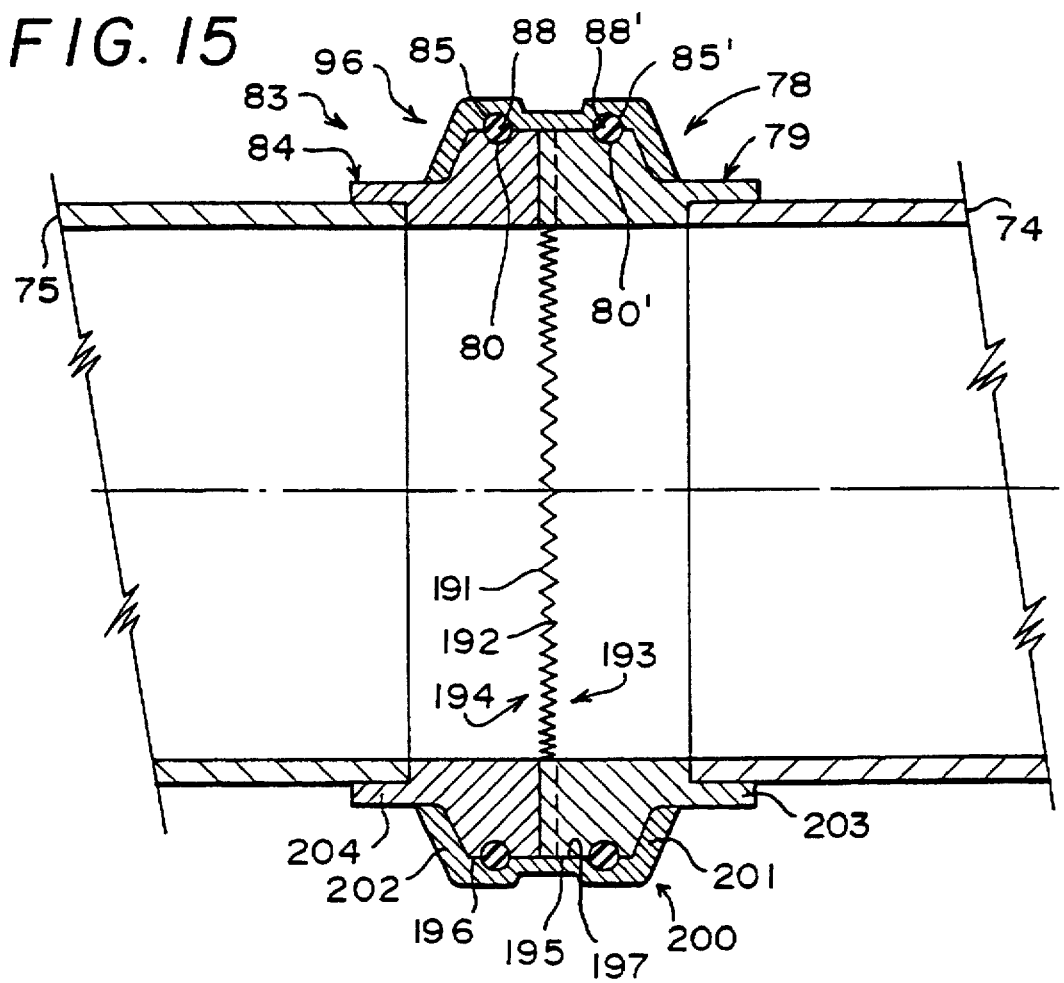
FIG. 15 is a longitudinal section of a fifth embodiment of locking couplings useful in the improved wastewater aeration system of FIG. 4, FIGS. 15A and 15B being half end views in elevation of alternative split ring retainers for the coupling of FIG. 15.

FIG. 15, like FIGS. 12–14, includes parts which correspond in function to like numbered parts in the preceding figures. As in FIGS. 12, 12A and 12B, FIG. 15 discloses a coupling in which the projections and receptacles are the peaks and valleys of circumferentially distributed ridges and furrows. In this embodiment, the ridges and furrows 191, 192 are radially oriented and formed in radial locking surfaces 193, 194 of first and second coupling sections 178 and 83. Each coupling section has its respective sealing member contacting surface 80, 85, but they do not compress the twin sealing members 88 and 88' between them. Rather, compression is achieved with the aid of additional sealing member contacting surfaces 195 and 196 extending peripherally in a peripherally disposed inner surface 197 of a split ring retainer 200. Thus, sealing members 88 and 88' are respectively subjected to compression on the one hand between surfaces 80 and 195 and on the other hand between surfaces 85 and 196.

Split ring retainer 200 includes inwardly projecting flange portions 201 and 202. These bear against complementary shoulders 203, 204 of coupling sections 78, 83 respectively.

FIG. 15A discloses one embodiment of split ring retainer 200. This ring includes upper and lower portions 207, 208 which are respectively symmetrical on either side of vertical center line 209. Thus, only the right hand sides of upper and lower portions 207, 208 are shown in the figure. Each of these portions has laterally projecting flanges 210, 211 with bores 214, 215 to receive a fastener, such as bolt 216, washer 217 and nut 218, to draw the upper and lower portions together. As the fastener is tightened, the coming together of the upper and lower portions 207, 208 not only places the sealing members 88, 88' under compression, but also, through the respective engagement of the mutually inclined surfaces of flange portions 201, 202 and shoulders 203, 204, exerts axial force on coupling sections 78, 83. Such axial force may be used to hold the coupling sections together, or to both draw and hold them together, thereby also maintaining engagement between the locking projections and receptacles 91, 92.

An alternative split ring retainer is shown in FIG. 15B. This figure is similar to FIG. 15A, in that it shows to the right of vertical center line 221 the right hand halves of the upper and lower portions of the retainer. Alternative split ring retainer 224 has upper and lower portions 222, 223 without lateral flanges of the type appearing in the FIG. 15A embodiment. Except for this difference and for the fact that retainer 224 may be drawn together by worm gear clamp 225, the strap of which nests within peripheral groove 227 in the retainer peripheral outer surface, this retainer is in other respects similar to retainer 200 of FIGS. 15 and 15A.

FIGS. 16, 16A and 16B illustrate the use of projections that are insertable in and/or withdrawable from a coupling section on which they are borne. In this embodiment, second coupling section 83 includes radially extending annular flange 231 having an arcuate array of receptacles 92 formed in its inward facing, radially oriented annular surface 232. First coupling section 78 has on it another flange 233, which is positioned opposite flange 231 in the same general orientation. Bores 234, 235 are positioned in flange 233 so that as coupling section 78 is rotated, they pass in registry with different ones of the receptacles 92 in the receptacle array on flange 231. Screws 238, 239 are insertable in the bores 234, 235. The latter may be prethreaded, or self-tapping screws may be used.

This coupling also includes a retainer ring 240. It has an annular, radially oriented flange portion which bears against the outer surface of flange 231 and which has an integral cylindrical, internally threaded peripheral portion 242 that engages corresponding threads formed on the periphery of flange 233.

In the makeup of this coupling, the coupling sections 78 and 83 are brought together and retainer ring 240 is installed but not fully tightened. The ring is advanced on the threads only so far as will permit the coupling sections and connected conduit segments 74, 75 to undergo relative rotation. At this point, the screws 238, 239 should be threaded in their bores 234, 235, with the screw tips remaining outside the receptacles 92 until the desired rotational alignment of the conduits has been established. The screws may then be advanced until their tips either enter receptacles 92 or strike the lands 248 between the receptacles. If the screws strike lands, the coupling sections are then slightly rotated relative to one another to bring the screw tips into registry with the receptacles.

As shown in FIG. 16B, the receptacles may have inclined upper side walls to facilitate entry of screw tips 246, 247. If a screw tip penetrates a receptacle 92 and strikes one of its upper sidewalls, a slight relative rocking of the coupling sections relative to one another will assist in centering the screw tips in the receptacles. The retainer ring 240 may now be given its final tightening, placing the sealing member 88 under axial compression.

Figure 17:
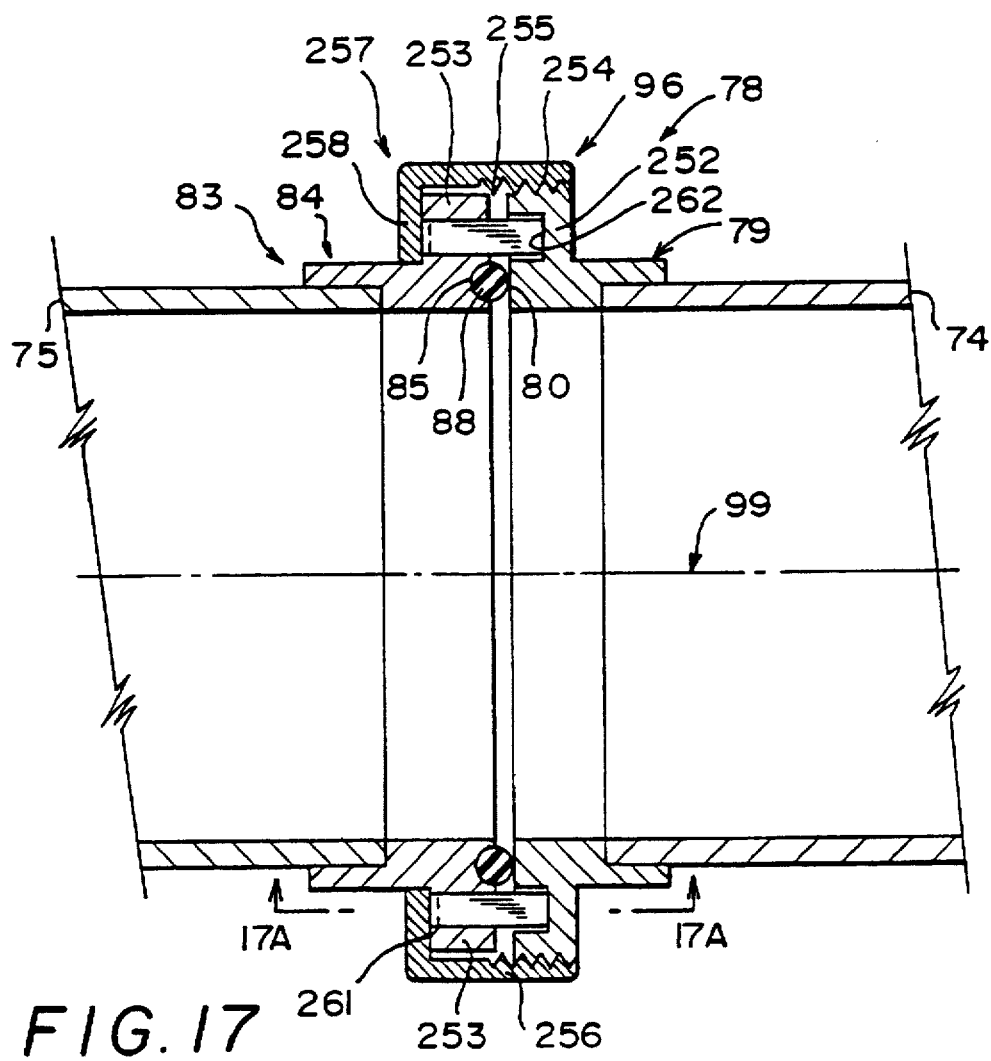
FIG. 17 is a longitudinal section of a seventh embodiment of locking couplings useful in the improved wastewater aeration system of FIG. 4, FIG. 17A being an enlarged partial section of the coupling of FIG. 17 taken along section line 17A—17A.
Figure 17A:
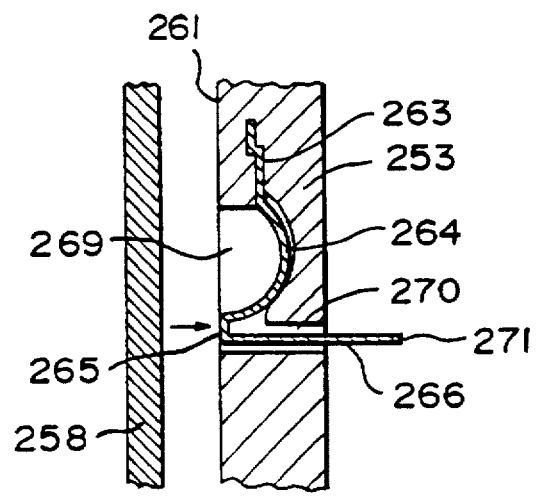

In FIGS. 17 and 17A, the coupling sections 78 and 83 each have annular, radially oriented flange portions 252, 253 which confront one another. Threads 254 formed about the periphery of flange portion 252 engage compatible threads 255 on the interior of cylindrical portion 256 of retainer ring 257. That ring has a flange portion 258 which, when the ring is tightened on its threads, bears against a radially oriented outward facing annular wall 261 of flange portion 253 for urging flange portions 252, 253, and the coupling sections 78, 83, of which they are parts, toward one another in the axial direction.

A circular array of receptacles similar to those illustrated in FIGS. 16A and 16B is provided in an inward facing annular radially oriented wall 262 of flange portion 252. An array of two or more projections 92 in the form of spring clips is mounted in flange 253, disposed at the same radius from the coupling center line 99 as the array of receptacles 92. As shown by sectional view 17A, the spring clip projections have integral anchor, bracing, follower, and finger sections 263–266.

Anchor section 263 includes a bend for anchoring purposes and is embedded in a crevice of similar shape and cross-section in the body of flange portion 253. Bracing section 264 is curved and positioned within a cavity 269 which is curved at the bottom to complement the curvature of bracing section 264 and opens outward throughwall 261. The follower section is a short flat area which coincides with wall 261 at the mouth of cavity 269, and bears against the retainer ring flange portion 258 when the joint is made up. Thus, when the retainer ring flange portion 258 is tightened against wall 261, it is in position to help retain the spring clip in position by acting as a backstop for follower section 265. This effectively prevents motion of finger section 266 in a direction perpendicular to flange portion 253. However, because finger section 266 extends through flange portion 253 toward the receptacles 92 by way of a slot 270 which is wider than the thickness of the finger section as viewed in FIG. 17A, the spring clip free end 271 is capable of some limited bending back and forth motion in peripheral directions. When an installer is attempting to engage the spring clip projections of coupling section 83 with multiple receptacles in coupling section 78, this bending action is of assistance in overcoming minor mismatches between the positions of the projections and receptacles.

In this particular embodiment, the finger sections 266 protrude sufficiently from flange portion 253, so that they may make initial engagement with receptacles 92 before tightening of the retainer ring 257 has compressed sealing member 88. Thus, in the make up of this coupling, establishment of the desired rotational alignment of the coupling sections and connected pipes is effected prior to compression of the sealing member.

These are but a few of many alternative types of locking couplings which may be utilized for rotational adjustment and anti-rotation locking with sealing of connected conduits either in waste water treatment facilities or in other applications. It would be impractical to attempt to list all of the potential modifications of these couplings which would be useful in accordance with the invention. However, a few further examples should be mentioned.

In the embodiments with ridge and furrow type projections and receptacles, such as in FIGS. 12 and 15, the ridges and furrows may have other profiles beside the sawtooth pattern shown herein. For example, the ridges and furrows may have smoothly curved crests and roots such as are shown in McElhose U.S. Pat. No. 2,423,069. Any other suitable profile may be employed, and these profile modifications are applicable not only when the ridges and furrows are axially oriented, as in FIG. 12, but also when they are radially oriented, as in FIG. 13. Projections in the form of small domes and receptacles in the form of cavities of corresponding shape may also be used.

Any suitable arrangement for capturing and holding the sealing member in place may be employed. For example see Fennema U.S. Pat. No. 2,464,744. While it is preferred to use as retainers either flanged rings or other types of devices which must be removed for the coupling sections to come apart, it is also contemplated that the coupling sections could be held together by heavy duty snap action detents such as have been used in the caps and barrels of pens and markers. See for example Wollensak U.S. Pat. No. 4,341,482. Snap action clasps may also be employed.

Embodiments have been disclosed above in which either the projections or receptacles need not be part of either coupling section. It is also possible to construct couplings having an array of receptacles on each coupling section and to lock the sections against relative rotation by a ball or a member of another shape which acts as a projection by engaging and bridging across between receptacles on both sections. See for example Williams U.S. Pat. No. 4,674,774. Thus, as an illustration, a locking coupling used in the invention may have a "projection" which is a ball or other free or tethered insertable member held in a first receptacle associated and fixed with respect to one coupling section and extending into a second selected receptacle among an array of plural receptacles associated and fixed with respect to the other coupling section. These receptacles may for example be notches of hemispheric, arcuate or other suitable cross-section. As a further example, one may construct couplings having on each coupling section an array of projections in the form of an axially extending spline and lock the sections against relative rotation by a rigid member that holds itself, or is held, in contact with both splines while extending in an axial direction to bridge across from one spline to the other, engaging both splines with one or more grooves of a shape complementary to the spline profile as viewed in cross-section, and either partly or completely surrounding the splines in the peripheral direction.

For certain aspects of the invention, elements of the coupling sections may be formed on the ends of the conduit segments, so that portions of the conduits may represent partial or complete coupling sections for purposes of the invention. For example, this may be done by steps performed during or subsequent to the manufacture of the conduit segments. Projections and/or receptacles may be formed in or added to pipe ends and sealing member contacting surfaces or followers may be formed by cementing rings to pipe surfaces or forming bell-like structures in the ends of pipes.

The invention encompasses devices which include more coupling sections than the first and second coupling sections referred to above. For example, it is possible to combine in one appliance of relatively short or long axial length two couplings in accord with the invention, having two pairs of first and second coupling sections. It is also possible to construct in one appliance a locking coupling according to the invention at one end and an expansion joint at the other. Either of these types of appliances and/or conduits connected thereby may be supported by attached floor-mounted stands of the fixed or sliding type. Couplings that combine rotational locking with expansion and/or contraction capabilities in a single pair of coupling sections may also be constructed.

Many other modifications to any of the components of the coupling are possible. Accordingly, it is believed that the invention is a broad one and should not be limited to the specific embodiments disclosed above. Rather, the invention should be interpreted to include all embodiments falling within the scope of the appended claims, and their equivalents.

The entire disclosure of U.S. Patent Application Ser. No. 08/130,515, filed Oct. 1, 1993, including the written description, claims and drawing thereof, are hereby incorporated herein by reference.

What is claimed is:

1. Wastewater treatment apparatus comprising:
 a plurality of oxygen-containing gas diffusers that
  must extend substantially horizontally in at least one horizontal direction for proper operation of the diffusers when they are discharging oxygen-containing gas into wastewater in which the diffusers are submerged, and a plurality of gas distribution conduits that respectively support the diffusers, supply oxygen-containing gas to the diffusers, and have gas-tight gas transmission connections with each other or with manifolds for passage of the gas, at least a portion of these gas-tight connections being through couplings each having first and second matingly compatible coupling sections adapted for relative rotation with respect to each other, when said coupling is not fully made up, at least one locking projection associated with, and having a fixed position with respect to, one of the coupling sections, at least when said coupling is fully made up, and a locking receptacle array including locking receptacles associated with, and having a fixed position with respect to, the other coupling section, at least when said coupling is fully made up, wherein the projection and receptacles are relatively moveable from a non-engaged condition to an engaged condition during make up of the coupling, and wherein the number of locking projections is substantially less than the number of locking receptacles in the locking receptacle array.

2. Wastewater treatment apparatus according to claim 1 wherein the gas distribution conduits respectively connect with the floor of a wastewater treatment tank through floor-mounted supporting stands that accommodate longitudinal motion of the gas distribution conduits relative to the stands for expansion or contraction of the conduits, and the respective couplings have at least one retaining member which engages the coupling sections and restrains them from separating when the coupling is fully made up, and which restrains them without longitudinally compressing the gas distribution conduits intermediate the connections.

3. Wastewater treatment apparatus according to claim 2 wherein the gas distribution conduits comprise single segment gas distribution conduits connected and rotationally locked with manifolds through said couplings.

4. Wastewater treatment apparatus according to claim 2 wherein the gas distribution conduits comprise gas distribution conduit strings consisting of two or more consecutive segments in series, said segments being inter-connected and rotationally locked with one another through said couplings.

5. Wastewater treatment apparatus according to claim 2 wherein the gas distribution conduits comprise gas distribution conduit strings composed of one or more groups each including two or more consecutive segments in series, said segments of said groups being inter-connected and rotationally locked with one another through said couplings.

6. Wastewater treatment apparatus according to claim 1 wherein the gas distribution conduits, whether in the form of single segments or strings of segments, have no fixed stands attached to them.

7. Wastewater treatment apparatus according to claim 1 wherein the gas distribution conduits, whether single segments or strings of segments, have no expansion joints connected to them.

8. Wastewater treatment apparatus according to any of claims 4–5 wherein the two or more consecutive segments in series have no expansion joints connected to them.

9. Wastewater treatment apparatus comprising:

a plurality of oxygen-containing gas diffusers that must extend substantially horizontally in at least one horizontal direction for proper operation of the diffusers when they are discharging oxygen-containing gas into wastewater in which the diffusers are submerged, and a plurality of gas distribution conduits that respectively support the diffusers, supply oxygen-containing gas to the diffusers, and have gas-tight gas transmission connections with each other or with manifolds for passage of the gas, wherein at least a portion of these gas-tight connections is through couplings each having first and second matingly compatible coupling sections adapted for relative rotation with respect to each other, when said coupling is not fully made up, at least one locking projection associated with, and having a fixed position with respect to, one of the coupling sections, at least when said coupling is fully made up, a locking receptacle array including locking receptacles associated with, and having a fixed position with respect to, the other coupling section, at least when said coupling is fully made up, and the projection and receptacles being relatively moveable from a non-engaged condition to an engaged condition during make up of the coupling, wherein first and second matingly compatible coupling sections are axially engageable and have first and second opposed sealing member contacting surfaces positioned in relation to the coupling sections for entering into engagement with, and generating compression forces against, when the coupling is in partially made up condition, a sealing member that forms a seal within the coupling prior to or upon full make up of the coupling, wherein the locking projection and locking receptacle array are in position for the locking projection to pass in and out of registry with a plurality of the locking receptacles during relative rotation of the coupling sections when the coupling is in partly made up condition, and wherein the locking receptacle array is in position for the locking projection to enter a selected one of the plurality of locking receptacles after the sealing member contacting surfaces enter into engagement with the sealing member and during movement of the coupling sections from partially made up condition to fully made up condition.

10. Wastewater treatment apparatus comprising:

a plurality of oxygen-containing gas diffusers that must extend substantially horizontally in at least one horizontal direction for proper operation of the diffusers when they are discharging oxygen-containing gas into wastewater in which the diffusers are submerged, and a plurality of gas distribution conduits that respectively support the diffusers, supply oxygen-containing gas to the diffusers, and have gas-tight gas transmission connections with each other or with manifolds for passage of the gas, wherein at least a portion of these gas-tight connections is through couplings each having first and second matingly compatible coupling sections adapted for relative rotation with respect to each other, when said coupling is not fully made up, at least one locking projection associated with, and having a fixed position with respect to, one of the coupling sections, at least when said coupling is fully made up, a locking receptacle array including locking receptacles associated with, and having a fixed position with respect to, the other coupling section, at least when said coupling is fully made up, and the projection and receptacles being relatively moveable from a non-engaged condition to an engaged condition during make up of the coupling, wherein the couplings include a sealing member and the first and second matingly compatible coupling sections include sealing member confining and contacting surfaces, wherein the coupling sections are connectable with one another by movement in which the coupling sections advance from partly made up to fully made up condition, wherein the locking receptacles are positioned for the locking projection to pass in and out of registry with a plurality of the locking receptacles during relative rotation of the coupling sections when the coupling is in partly made up condition, wherein the coupling includes a retaining member that connects said coupling sections to one another in both partly and fully made up conditions but affords freedom of movement of these sections in a range of movement from partly to fully made up condition throughout which the sealing member confining and contacting surfaces are held sufficiently close together to maintain confinement of the sealing member between said surfaces, and wherein said range includes positions corresponding to partly and fully made up condition of the coupling in which the locking projection respectively is not and is within a selected one of the plurality of locking receptacles.

11. Wastewater treatment apparatus according to claim 10 wherein the coupling sections are engageable by axial movement toward one another.

12. Wastewater treatment apparatus according to claim 10 wherein the couplings respectively include as a retaining member a threaded ring having a thread which engages a compatible thread on one of the coupling sections and a flange or other projection which engages one or more parts of the other coupling section for drawing said sections toward one another.

13. Wastewater treatment apparatus according to any of claims 9–12 wherein the sealing member is an O-ring.

14. Wastewater treatment apparatus comprising:

a plurality of oxygen-containing gas diffusers that must extend substantially horizontally in at least one horizontal direction for proper operation of the diffusers when they are discharging oxygen-containing gas into wastewater in which the diffusers are submerged, and a plurality of gas distribution conduits that respectively support the diffusers, supply oxygen-containing gas to the diffusers, and have gas-tight gas transmission connections with each other or with manifolds for passage of the gas, wherein at least a portion of these gas-tight connections is through couplings each having first and second matingly compatible coupling sections adapted for relative rotation with respect to each other, when said coupling is not fully made up, at least one locking projection associated with, and having a fixed position with respect to, one of the coupling sections, at least when said coupling is fully made up, a locking receptacle array including locking receptacles associated with, and having a fixed position with respect to, the other coupling section, at least when said coupling is fully made up, and the projection and receptacles being relatively moveable from a non-engaged condition to an engaged condition during make up of the coupling, wherein the first and second matingly compatible coupling sections are axially engageable and respectively have first and second opposed sealing member contacting surfaces that are spaced apart in a generally radial direction, wherein the sealing member contacting surfaces are positioned to enter into engagement with, and to establish at least partly radial compression forces against, a sealing member that forms a seal within the coupling while generating a generally radial counter-force in the sealing member which acts upon the coupling sections during make up of the coupling, and wherein the locking receptacle array, the locking projection and the remaining structure of the coupling sections are so oriented that, after establishment of said radial compression forces but prior to full make up of the coupling, the locking projection may be caused, through relative rotation of said projections and array and through relative movement of the projection and array in a generally axial direction, to pass through a plurality of rotational positions that are in registry with different locking receptacles in the array and to enter a selected one of the locking receptacles.

15. Wastewater treatment apparatus according to claim 14 wherein the at least partly radial compression forces and counter-force are exclusively radial.

16. Wastewater treatment apparatus according to claim 14 wherein the magnitude of the respective components of compression and counter force in the radial direction exceed those in the axial direction.

17. Wastewater treatment apparatus comprising:

a plurality of oxygen-containing gas diffusers that must extend substantially horizontally in at least one horizontal direction for proper operation of the diffusers when they are discharging oxygen-containing gas into wastewater in which the diffusers are submerged, and a plurality of gas distribution conduits that respectively support the diffusers, supply oxygen-containing gas to the diffusers, and have gas-tight gas transmission connections with each other or with manifolds for passage of the gas, wherein at least a portion of these gas-tight connections is through couplings each having first and second matingly compatible coupling sections adapted for relative rotation with respect to each other, when said coupling is not fully made up, at least one locking projection associated with, and having a fixed position with respect to, one of the coupling sections, at least when said coupling is fully made up, a locking receptacle array including locking receptacles associated with, and having a fixed position with respect to, the other coupling section, at least when said coupling is fully made up, and the projection and receptacles being relatively moveable from a non-engaged condition to an engaged condition during make up of the coupling, wherein the first and second matingly compatible coupling sections are axially engageable, are not portions of the conduits and are formed at least in part of synthetic polymeric material and have first and second sealing member contacting surfaces, wherein the sealing member contacting surfaces and at least one sealing member are positioned in the coupling to form a seal within the coupling, wherein the sealing member or members have dimensions of both generally axial length and radial height, when viewed in section in a plane which includes the member central axis or axes, wherein the at least one locking projection is formed of synthetic polymeric material, extends at least partly in a generally axial direction, has an axial dimension which is less than the axial length of the sealing member, and has a predetermined thickness measured in a generally peripheral direction in the coupling, wherein adjacent locking receptacles in the locking receptacle array have common walls formed of synthetic polymeric material and with predetermined thickness measured in a generally peripheral direction in the coupling, wherein the array extends with its receptacles distributed in a generally peripheral direction across a given angular interval about a central axis of the coupling and is positioned so that a different locking receptacle in the array is in registry with the locking projection for each of a plurality of different relative rotational positions of the coupling sections, and wherein the locking receptacle array is oriented so that the locking projection may, on establishment of a desired relative rotational alignment of conduits connected by the coupling, enter at least one selected locking receptacle.

18. Wastewater treatment apparatus according to claim 17 wherein the axial dimension of the locking projections is up to about 0.5 of the axial length of the sealing member.

19. Wastewater treatment apparatus according to claim 17 wherein the axial dimension of the locking projections is up to about 0.3 of the axial length of the sealing member.

20. Wastewater treatment apparatus according to claim 17 wherein the axial dimension of the locking projections is up to about 0.2 of the axial length of the sealing member.

21. Wastewater treatment apparatus comprising:
   a plurality of oxygen-containing gas diffusers that
      must extend substantially horizontally in at least one horizontal direction for proper operation of the diffusers when they are discharging oxygen-containing gas into wastewater in which the diffusers are submerged,
   and a plurality of gas distribution conduits that respectively
      support the diffusers,
      supply oxygen-containing gas to the diffusers, and
      have gas-tight gas transmission connections with each other or with manifolds for passage of the gas,
   wherein at least a portion of these gas-tight connections is through couplings each having
      first and second matingly compatible coupling sections adapted for relative rotation with respect to each other, when said coupling is not fully made up,
      at least one locking projection associated with, and having a fixed position with respect to, one of the coupling sections, at least when said coupling is fully made up,
      a locking receptacle array including locking receptacles associated with, and having a fixed position with respect to, the other coupling section, at least when said coupling is fully made up, and
      the projection and receptacles being relatively moveable from a non-engaged condition to an engaged condition during make up of the coupling,
   wherein the coupling comprises a locking projection array having a plurality of locking projections, of molded material, having a fixed position with respect to at least one of the coupling sections at least when the coupling is fully made up, wherein the locking projection array extends with its projections distributed in a generally peripheral direction across a given angular interval about a central axis of the coupling, wherein the locking receptacle array includes locking receptacles of molded material and extends with its receptacles distributed in a generally peripheral direction across a given angular interval about a central axis of the coupling and positioned so that at least two different locking receptacles in the locking receptacle array are in registry with at least two locking projections for each of a plurality of different relative rotational positions of the coupling sections, and wherein the number of locking projections is at least about 20% less than the number of locking receptacles in the respective arrays.

22. Wastewater treatment apparatus according to claim 21 wherein the number of locking projections is at least about 50% less than the number of locking receptacles in the respective arrays.

23. Wastewater treatment apparatus according to claim 21 wherein the number of locking projections is at least about 75% less than the number of locking receptacles in the respective arrays.

24. Wastewater treatment apparatus according to any of claims 21–23 wherein the first and second matingly compatible coupling sections are of synthetic polymeric material.

25. Wastewater treatment apparatus according to claim 24 wherein the first and second matingly compatible coupling sections and the locking projections and receptacles are molded of synthetic polymeric material.

26. Wastewater treatment apparatus according to claim 1 wherein the locking receptacles traverse sufficiently small arcs about the coupling central axis and the locking projections are sufficiently narrow in the peripheral direction so that the coupling provides fine increments of angular adjustment of conduits connected by the coupling of about 10° or less.

27. Wastewater treatment apparatus according to claim 26 wherein the increments of angular adjustment are about 5° or less.

28. Wastewater treatment apparatus according to claim 26 wherein the increments of angular adjustment are about 3° or less.

29. Wastewater treatment apparatus according to claim 1 wherein the coupling includes a sealing member of predetermined axial length and radial height and the thickness of the at least one locking projection or the thickness of the adjacent locking receptacles or the thickness of both
   a. is less than the axial length of the sealing member, or
   b. is less than the radial height of the sealing member cross section, or
   c. subtends or traverses an arc of about 10° or less about the central axis of the coupling.

30. Wastewater treatment apparatus according to claim 29 wherein the arc defining the thickness of the at least one locking projection or the thickness of the adjacent locking receptacles or the thickness of both is about 5° or less.

31. Wastewater treatment apparatus according to claim 29 wherein the arc defining the thickness of the at least one locking projection or the thickness of the adjacent locking receptacles or the thickness of both is about 3° or less.

32. Apparatus according to claim 1 wherein
   the first coupling section has an end that is initially insertable in the second coupling section with the first and second coupling sections being in axial misalignment during initial make up of the coupling, the at least one locking projection includes an array of peripherally distributed projections, and the projections in said array are spaced from one another angularly by arcuate intervals that are about 45° or less.

33. Wastewater treatment apparatus according to claim 32 wherein the arcuate intervals are about 30° or less.

34. Wastewater treatment apparatus according claim 1 wherein the coupling includes a sealing member and at least part of any counter-force generated in the sealing member and exerted upon the coupling sections during make up of the coupling is in a generally radial direction, while the direction of movement of the at least one locking projection in its locking motion is generally axial.

35. Wastewater treatment apparatus according to claim 1 wherein a diffuser is mounted on at least one of the first and/or second conduit(s), the fixture being so shaped and positioned that the force of gravity tends to create a rotational moment of at least one of the respective conduit(s) relative to the other about the longitudinal axis thereof.

36. Wastewater treatment apparatus comprising:

a plurality of oxygen-containing gas diffusers that must extend substantially horizontally in at least one horizontal direction for proper operation of the diffusers when they are discharging oxygen-containing gas into wastewater in which the diffusers are submerged, and a plurality of gas distribution conduits that respectively support the diffusers, supply oxygen-containing gas to the diffusers, and have gas-tight gas transmission connections with each other or with manifolds for passage of the gas, wherein at least a portion of these gas-tight connections are through couplings each having first and second matingly compatible coupling sections that are members separate from the conduits, include conduit-engaging portions and are fixedly engaged with the conduits through said conduit-engaging portions, said first and second coupling sections being adapted for relative rotation with respect to each other, when said coupling is not fully made up, at least one locking projection associated with, and having a fixed position with respect to, one of the coupling sections, at least when said coupling is fully made up, and a locking receptacle array including locking receptacles associated with, and having a fixed position with respect to, the other coupling section, at least when said coupling is fully made up, and wherein the projection and receptacles are relatively moveable from a non-engaged condition to an engaged condition during make up of the coupling.

37. Wastewater treatment apparatus comprising:

a plurality of oxygen-containing gas diffusers that must extend substantially horizontally in at least one horizontal direction for proper operation of the diffusers when they are discharging oxygen-containing gas into wastewater in which the diffusers are submerged, and a plurality of gas distribution conduit strings including conduit segments that respectively connect with the floor of a wastewater treatment tank through floor-mounted supporting stands that accommodate longitudinal motion of the gas distribution conduit segments relative to the stands and afford expansion or contraction of the overall lengths of the respective strings or of the overall lengths of groups of segments in the strings, support the diffusers, supply oxygen-containing gas to the diffusers, and have gas-tight gas transmission connections with each other or with manifolds for passage of the gas, at least a portion of these gas-tight connections being through couplings each having first and second matingly compatible coupling sections adapted for relative rotation with respect to each other, when said coupling is not fully made up, at least one locking projection associated with, and having a fixed position with respect to one of the coupling sections, at least when said coupling is fully made up, and a locking receptacle array including locking receptacles associated with, and having a fixed position with respect to, the other coupling section, at least when said coupling is fully made up, wherein the projection and receptacles are relatively moveable from a non-engaged condition to an engaged condition during make up of the coupling.

38. Wastewater treatment apparatus comprising:

a plurality of oxygen-containing gas diffusers that must extend substantially horizontally in at least one horizontal direction for proper operation of the diffusers when they are discharging oxygen-containing gas into wastewater in which the diffusers are submerged, and a plurality of gas distribution conduits that respectively connect with the floor of a wastewater treatment tank through floor-mounted supporting stands that accommodate longitudinal motion of the gas distribution conduit segments relative to the stands, support the diffusers, supply oxygen-containing gas to the diffusers, and have gas-tight gas transmission connections with each other or with manifolds for passage of the gas, at least a portion of these gas-tight connections being through couplings each having first and second matingly compatible coupling sections adapted for relative rotation with respect to each other, when said coupling is not fully made up, at least one locking projection associated with, and having a fixed position with respect to one of the coupling sections, at least when said coupling is fully made up, a locking receptacle array including locking receptacles associated with, and having a fixed position with respect to, the other coupling section, at least when said coupling is fully made up, the projection and receptacles being relatively moveable from a non-engaged condition to an engaged condition during make up of the coupling, and at least one retaining member which engages the coupling sections and restrains them from separating when the coupling is fully made up, and restrains the coupling sections without longitudinally compressing the gas distribution conduits intermediate the connections.

39. A wastewater treatment apparatus according to claim 1, wherein the number of locking projections is at least about 20% less than the number of locking receptacles in the locking receptacle array.

40. Wastewater treatment apparatus according to claim 1 wherein the number of locking projections is at least about 50% less than the number of locking receptacles in the respective arrays.

41. Wastewater treatment apparatus according to claim 1 wherein the number of locking projections is at least about 75% less than the number of locking receptacles in the respective arrays.

42. Wastewater treatment apparatus according to claim 1 wherein the first and second matingly compatible coupling sections are of synthetic polymeric material.

43. Wastewater treatment apparatus according to claim 1 wherein the first and second matingly compatible coupling sections and the locking projections and receptacles are molded of synthetic polymeric material.

44. A wastewater treatment apparatus according to any one of claims 9, 10, 14, 17, 21, 36, 37 or 38 wherein the number of locking projections is substantially less than the number of locking receptacles in the locking receptacle array.

45. A wastewater treatment apparatus according to claim 44, wherein the number of locking projections is at least about 20% less than the number of locking receptacles in the locking receptacle array.

46. Wastewater treatment apparatus according to claim 36 wherein the gas distribution conduits respectively connect with the floor of a wastewater treatment tank through floor-mounted supporting stands that accommodate longitudinal motion of the gas distribution conduits relative to the stands for expansion or contraction of the conduits, and the respective couplings have at least one retaining member which engages the coupling sections and restrains them from separating when the coupling is fully made up, and which restrains them without longitudinally compressing the gas distribution conduits intermediate the connections.

47. Wastewater treatment apparatus according to claims 36, 37 or 38 wherein the gas distribution conduits comprise gas distribution conduit strings consisting of two or more consecutive segments in series, said segments being interconnected and rotationally locked with one another through said couplings.

48. Wastewater treatment apparatus according to claims 36, 37 or 38 wherein the segments of said gas distribution conduits, whether in the form of single segments or strings of segments, respectively connect with the floor of a wastewater treatment tank through floor-mounted supporting stands that accommodate longitudinal motion of the gas distribution conduits relative to the stands for expansion or contraction of the conduits, and have no expansion joints connected to them.

49. Wastewater treatment apparatus according to claims 36, 37 or 38 wherein the coupling sections are engageable by axial movement toward one another.

50. Wastewater treatment apparatus according to claim 49 wherein the couplings respectively include as a retaining member a threaded ring having a thread which engages a compatible thread on one of the coupling sections and a flange or other projection which engages one or more parts of the other coupling section for drawing said sections toward one another.

51. Wastewater treatment apparatus according to claim 1, wherein the coupling sections have sealing member contacting surfaces for generating compressive forces against a sealing member that forms a seal within the coupling prior to or upon full make-up of the coupling.

52. Wastewater treatment apparatus according to claim 51, wherein the locking receptacle array is in position for the locking projection to enter a selected one of the plurality of locking receptacles after the sealing member contacting surfaces enter into engagement with the sealing member and during movement of the coupling sections from a partially made-up condition to a fully made-up condition.

53. Wastewater treatment apparatus according to claim 1, wherein the locking projection and locking receptacle array are in position for the locking projection to pass in and out of registry with a plurality of the locking receptacles during relative rotation of the coupling sections when the coupling is in a partially made-up condition.

54. Wastewater treatment apparatus according to claim 1, wherein the coupling includes a retaining member that connects said coupling sections to one another in both partly and fully made-up conditions but affords freedom of movement of these sections in a range of movement from a partly to a fully made-up condition throughout which sealing member confining and contacting surfaces are held sufficiently close together to maintain confinement of a sealing member between said surfaces.

55. Wastewater treatment apparatus according to claim 54, wherein said range of movement includes positions corresponding to partly and fully made-up conditions of the coupling in which the locking projection respectively is not and is within a selected one of the plurality of locking receptacles.

56. Wastewater treatment apparatus according to claim 1, wherein the coupling sections have sealing member contacting surfaces positioned to enter into engagement with, and to establish at least partially radial compression forces against, a sealing member that forms a seal within the coupling while generating a generally radial counterforce in the sealing member which acts upon the coupling sections during make-up of the coupling.

57. Wastewater treatment apparatus according to claim 1, wherein the at least one locking projection is formed of synthetic polymeric material, extends at least partly in a generally axial direction, and has a predetermined thickness measured in a generally peripheral direction in the coupling; and wherein the adjacent locking receptacles in the locking receptacle array have common walls formed of synthetic polymeric material and with predetermined thickness measured in a generally peripheral direction in the coupling.

58. Wastewater treatment apparatus according to claim 1, wherein the receptacle array extends with its receptacles distributed in a generally peripheral direction across a given angular interval about a central axis of the coupling and is positioned so that a different locking receptacle in the array is in registry with the locking projection for each of a plurality of different relative rotational positions of the coupling section.

59. Wastewater treatment apparatus according to claim 1, wherein each coupling includes a locking projection array having a plurality of locking projections of molded material, and wherein the locking receptacle array includes locking receptacles of molded material.

60. Wastewater treatment apparatus according to claim 1, wherein each coupling includes a locking projection array which has a plurality of locking projections and extends with its projections distributed in a generally peripheral direction across a given angular interval about a central axis of the coupling, and wherein the locking receptacle array extends with its receptacles distributed in a generally peripheral direction across a given angular interval about the central axis of the coupling.

61. Wastewater treatment apparatus according to claim 1, wherein each coupling includes a plurality of locking projections, and wherein the locking receptacle array includes locking receptacles positioned so that at least two different locking receptacles in the locking receptacle array are in registry with at least two locking projections for each of a plurality of different relative rotational positions of the coupling sections.

62. Wastewater treatment apparatus according to claim 1 or 37, wherein the coupling sections are members separate from the conduits, include conduit engaging portions, and are fixedly engaged with the conduits through said conduit-engaging portions.

63. Wastewater treatment apparatus according to claim 1, wherein the gas distribution conduits include conduit segments that connect with the floor of a waste water treatment tank through floor-mounted supporting stands that accommodate longitudinal motion of the gas distribution conduit segments relative to the stands.

64. Wastewater treatment apparatus according to claim 1, 9 or 36, wherein the respective couplings include at least one retaining member which engages the coupling sections and restrains them from separating when the coupling is fully made up, and restrains the coupling sections without longitudinally compressing the gas distribution conduits intermediate the connections.

65. Wastewater treatment apparatus according to claim 1 wherein the first and second matingly compatible coupling sections are members separate from the conduits, include conduit-engaging portions and are fixedly engaged with the conduits through said conduit-engaging portions, the gas distribution conduits respectively connect with the floor of a wastewater treatment tank through floor-mounted supporting stands that accommodate longitudinal motion of the gas distribution conduits relative to the stands for expansion or contraction of the conduits, and the respective couplings have at least one retaining member which engages the coupling sections and restrains them from separating when the coupling is fully made up, and which restrains them without longitudinally compressing the gas distribution conduits intermediate the connections.

* * * * *